US008400906B2

(12) United States Patent
Lee et al.

(10) Patent No.: US 8,400,906 B2
(45) Date of Patent: Mar. 19, 2013

(54) METHOD AND APPARATUS FOR ALLOCATING BACKHAUL TRANSMISSION RESOURCE IN WIRELESS COMMUNICATION SYSTEM BASED ON RELAY

(75) Inventors: In Ho Lee, Gyeonggi-do (KR); Joon Young Cho, Gyeonggi-do (KR); Jin Kyu Han, Seoul (KR); Ju Ho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 365 days.

(21) Appl. No.: 12/722,278

(22) Filed: Mar. 11, 2010

(65) Prior Publication Data

US 2010/0232285 A1 Sep. 16, 2010

(30) Foreign Application Priority Data

Mar. 11, 2009 (KR) .................. 10-2009-0020660
Jun. 22, 2009 (KR) .................. 10-2009-0055597

(51) Int. Cl.
*H04W 4/00* (2009.01)
*H04W 72/00* (2009.01)
*H04J 11/00* (2006.01)
*H04B 7/14* (2006.01)
*H04B 7/208* (2006.01)
*H04L 27/28* (2006.01)

(52) U.S. Cl. ........ 370/206; 370/210; 370/319; 370/329; 370/344; 370/535; 375/260; 455/13.1; 455/450

(58) Field of Classification Search .................. 370/206, 370/210, 319, 329, 344, 535; 375/260; 455/13.1, 455/450

See application file for complete search history.

(56) References Cited

U.S. PATENT DOCUMENTS

| 7,280,609 | B2* | 10/2007 | Dottling et al. | 375/295 |
|---|---|---|---|---|
| 7,317,680 | B2* | 1/2008 | Ma et al. | 370/203 |
| 7,486,735 | B2* | 2/2009 | Dubuc et al. | 375/260 |
| 2004/0001460 | A1 | 1/2004 | Bevan et al. | |
| 2006/0159160 | A1* | 7/2006 | Kim et al. | 375/148 |
| 2007/0160019 | A1 | 7/2007 | Classon et al. | |
| 2008/0090575 | A1 | 4/2008 | Barak et al. | |
| 2008/0095074 | A1* | 4/2008 | Kwon et al. | 370/255 |
| 2008/0313526 | A1* | 12/2008 | Choi et al. | 714/780 |
| 2009/0067378 | A1* | 3/2009 | Luo et al. | 370/329 |
| 2009/0252079 | A1* | 10/2009 | Zhang et al. | 370/315 |
| 2009/0303918 | A1* | 12/2009 | Ma et al. | 370/315 |
| 2010/0077265 | A1* | 3/2010 | Wei et al. | 714/701 |
| 2010/0086066 | A1* | 4/2010 | Chrabieh et al. | 375/260 |
| 2010/0202386 | A1* | 8/2010 | Takaoka et al. | 370/329 |
| 2011/0038284 | A1* | 2/2011 | Senarath et al. | 370/279 |
| 2011/0306291 | A1* | 12/2011 | Ma et al. | 455/9 |

* cited by examiner

*Primary Examiner* — Alpus H Hsu
(74) *Attorney, Agent, or Firm* — The Farrell Law Firm, P.C.

(57) ABSTRACT

In a relay based wireless communication system, a method for transmitting an uplink backhaul sub-frame of a relay node includes obtaining scheduling information for an uplink backhaul sub-frame through a downlink backhaul control channel from a base station, and performing a rate matching and mapping of data by regarding at least one predefined symbol as a blank symbol. The predefined symbol is located at a front part or a rear part of the scheduled uplink backhaul sub-frame. The transmitting method further includes performing a multiplexing of the uplink backhaul sub-frame, and transmitting the multiplexed uplink backhaul sub-frame. This method can eliminate an overlap of transmission and reception timing in a relay node due to an RF transmission/reception switching time delay. Also, the method can make better use of wireless backhaul resources and minimize an influence on conventional systems by offering the compatibility with conventional uplink and downlink sub-frame structures.

16 Claims, 17 Drawing Sheets

METHOD AND APPARATUS FOR ALLOCATING BACKHAUL TRANSMISSION RESOURCE IN WIRELESS COMMUNICATION SYSTEM BASED ON RELAY

PRIORITY

This application claims priority to applications filed with the Korean Intellectual Property Office on Mar. 11, 2009 and Jun. 22, 2009 and assigned Serial Nos. 10-2009-0020660 and 10-2009-0055597, respectively, the content of which are incorporated herein by reference.

BACKGROUND OF THE INVENTION

1. Field of the Invention

The present invention relates in general to a wireless relay of a wireless communication system and, more particularly, to a method and apparatus for designing backhaul sub-frames of an uplink and a downlink for a layer-3 relay including the functions of a base station.

2. Description of the Related Art

In modern mobile communication systems, Orthogonal Frequency Division Multiplexing (OFDM) and Single Carrier Frequency Division Multiple Access (SC-FDMA) have been widely studied as useful techniques for high-rate data transmission in a wireless channel. OFDM and SC-FDMA techniques are employed respectively for the downlink and uplink standardized by the Evolved UMTS Terrestrial Radio Access (E-UTRA) based on the third Generation Partnership Project (3GPP) Universal Mobile Telecommunication Services (UMTS) technology. SC-FDMA is a technique based on single carrier transmission while allowing the orthogonality of a multi-user like OFDM. The primary advantage of SC-FDMA is a lower Peak-to-Average Power Ratio (PAPR) of a transmission signal. Therefore, the SC-FDMA technique applied to mobile communication systems may enhance the cell coverage because of its lower PAPR in comparison with the OFDM technique.

A Long Term Evolution Advanced (LTE-A) system allows a higher rate data transmission than a conventional LTE system, thus requiring a new technique for compensating signal distortion. Normally signal distortion due to a path loss of a channel is one of critical restrictions in high-rate data transmission under limited resources. A wireless relay technique is introduced to overcome the above problem. In this technique, a wireless relay node disposed between an initial transmitter and a final receiver compensates a path loss of a signal delivered from the transmitter and sends a compensated signal to the receiver. That is, such a wireless relay technique improves a path loss unfavorably occurring between the transmitter and the receiver, thus allowing the improvement in performance of user equipment at cell peripheries and the extension of system coverage.

If a wireless relay node simultaneously performs signal reception and transmission, a transmitted signal may often act as interference to a received signal. Thus, a wireless relay node requires a separation between a reception link and a transmission link. These links may be separated as shown in Table 1.

TABLE 1

| | |
|---|---|
| Time Division Scheme | Separation of Transmission/Reception Links in Different Time Resources at Same Frequency Band |

TABLE 1-continued

| | |
|---|---|
| Frequency Division Scheme | Separation of Transmission/Reception Links in Different Frequency Resources at Same Time Resource |

In Table 1, the frequency division scheme may need a broad gap between adjacent frequency bands so as to avoid interference between such bands. Thus, the time division scheme is normally used for an effective allocation of frequency resources.

Additionally, as shown in Table 2, a wireless relay system may be classified into four types according to the function of a relay node.

TABLE 2

| | | |
|---|---|---|
| Layer-0 Relay | (L0) | Amplify and Deliver All Received Signals |
| Layer-1 Relay | (L1) | Amplify and Deliver Received Signals |
| Layer-2 Relay | (L2) | Demodulate, Decode, Encode, Modulate and Deliver Received Signals |
| Layer-3 Relay | (L3) | Perform Functions of Base Station Including Relay Function |

Particularly, the L3 relay system may allow a distinction between a relay node cell and a macro cell, make better use of frequency resources, and facilitate the introduction of a wireless relay in a cellular system.

A dominant feature of the L3 relay system is a wireless backhaul link between a base station and a relay node. A wireless backhaul link means that a relay node receives downlink data of user equipment from a base station or transmits uplink data of user equipment to a base station. A relay node distinguishes such a backhaul link from links with user equipment according to the time division scheme.

A relay node should perform a Radio Frequency (RF) transmission/reception switching before and after a backhaul sub-frame. Unfortunately, this may cause a switching time delay at a relay node. Therefore, backhaul sub-frames of the uplink and downlink in the L3 relay system should be designed in consideration of a time delay in an RF transmission/reception switching and the compatibility with sub-frames of normal uplink and downlink.

BRIEF SUMMARY OF THE INVENTION

Accordingly, the present invention is to address the above-mentioned problems and/or disadvantages and to provide at least the advantages described below.

An aspect of the present invention is to provide an uplink backhaul sub-frame structure and a downlink backhaul sub-frame structure in an L3 relay system.

Another aspect of the present invention is to provide uplink and downlink backhaul sub-frame structures which may reduce a time delay in an RF transmission/reception switching when employing an L3 relay and may be compatible with conventional uplink and downlink sub-frame structures.

According to one aspect of the present invention, provided is a method for transmitting an uplink backhaul sub-frame of a relay node in a relay based wireless communication system, the method including obtaining scheduling information for an uplink backhaul sub-frame through a downlink backhaul control channel from a base station; performing a rate matching and mapping of data by regarding at least one predefined symbol as a symbol for blank, the predefined symbol being located at a front part or a rear part of the scheduled uplink backhaul sub-frame; performing a multiplexing of the uplink backhaul sub-frame; and transmitting the multiplexed uplink backhaul sub-frame.

According to another aspect of the present invention, provided is a method for receiving an uplink backhaul sub-frame of a base station in a relay based wireless communication system, the method including performing a scheduling of an uplink backhaul sub-frame of a relay node; receiving the scheduled uplink backhaul sub-frame; performing a demultiplexing of the received uplink backhaul sub-frame; performing a de-mapping of symbols by regarding at least one predefined symbol as a symbol for blank, the predefined symbol being located at a front part or a rear part of the scheduled uplink backhaul sub-frame; and performing a decoding of the de-mapped symbols.

According to still another aspect of the present invention, provided is a relay node in a relay based wireless communication system, the relay node including a plurality of symbol generators configured to generate a Reference Signal (RS) symbol and Physical Uplink Shared CHannel (PUSCH) symbols; a Fast Fourier Transform (FFT) device configured to receive the PUSCH symbols and to perform a transform into frequency domain signals; a sub-carrier symbol mapper configured to receive the RS symbol and the transformed PUSCH symbols and to perform a mapping to the scheduled uplink backhaul sub-frame; and an uplink physical channel symbol generating and mapping controller configured to control a PUSCH symbol generator among the symbol generators to perform a rate matching by regarding at least one predefined symbol as a symbol for blank, the predefined symbol being located at a front part or a rear part of the scheduled uplink backhaul sub-frame, and further configured to control the sub-carrier symbol mapper to perform a mapping of the received symbols by regarding the at least one predefined symbol as the symbol for blank.

According to yet another aspect of the present invention, provided is a base station in a relay based wireless communication system, the base station including a sub-carrier symbol de-mapper configured to perform a de-mapping of sub-carrier reception symbols to a Reference Signal (RS) symbol and Physical Uplink Shared CHannel (PUSCH) symbols; an inverse Fast Fourier Transform (IFFT) device configured to perform a transform of the de-mapped PUSCH symbols into time domain signals; a PUSCH symbol decoder configured to perform a decoding of the transformed PUSCH symbols; an RS symbol based channel information generator configured to generate channel information depending on the de-mapped RS symbol; and an uplink physical channel symbol decoding and de-mapping controller configured to control all of the sub-carrier symbol de-mapper, the PUSCH symbol decoder and the RS symbol based channel information generator by regarding at least one predefined symbol as a symbol for blank, the predefined symbol being located at a front part or a rear part of the scheduled uplink backhaul sub-frame.

According to further another aspect of the present invention, provided is a method for transmitting a downlink backhaul sub-frame of a base station in a relay based wireless communication system, the method including performing a scheduling of a downlink backhaul sub-frame of a relay node and a scheduling of a downlink access sub-frame of user equipment in a macro cell; performing a mapping of control symbols of both the scheduled relay node and the user equipment to a Physical Downlink Control CHannel (PDCCH) region and a mapping of data symbols of the scheduled user equipment to a Physical Downlink Control CHannel (PDSCH) region; performing a rate matching of data of the scheduled relay node in consideration of the PDSCH region excluding last M+N symbols of the downlink backhaul sub-frame and a mapping of the rate-matched data symbols to the PDSCH region excluding the last M+N symbols wherein M is the number of symbols predefined for a switching time delay and N is the number of symbols used for PDCCH transmission of the relay node; and performing a multiplexing of PDCCH, PDSCH and a Reference Signal (RS) of the scheduled relay node and the user equipment.

According to further another aspect of the present invention, provided is a method for receiving a downlink backhaul sub-frame of a relay node in a relay based wireless communication system, the method including performing a demultiplexing of a Physical Downlink Control CHannel (PDCCH), a Physical Downlink Shared CHannel (PDSCH) and a Reference Signal (RS) in a downlink backhaul sub-frame received from a base station; obtaining scheduling information of the downlink backhaul sub-frame by decoding the PDCCH; performing a de-mapping of data symbols in PDSCH regions excluding last M+N symbols of the scheduled downlink backhaul sub-frame wherein M is the number of symbols predefined for a switching time delay and N is the number of symbols used for PDCCH transmission of the relay node; and obtaining downlink backhaul data by decoding the de-mapped data symbols.

According to further another aspect of the present invention, provided is a base station in a relay based wireless communication system, the base station including a plurality of sub-carrier symbol generators configured to generate a Reference Signal (RS) symbol, Physical Downlink Control CHannel (PDCCH) symbols and Physical Downlink Shared CHannel (PDSCH) symbols; a sub-carrier symbol mapper configured to receive the RS symbol, the PDCCH symbols and the PDSCH symbols and to perform a mapping to the scheduled downlink backhaul sub-frame; and a downlink physical channel symbol generating and mapping controller configured to control both the sub-carrier symbol generators and the sub-carrier symbol mapper to perform a rate matching in consideration of a PDSCH region excluding last M+N symbols of the scheduled downlink backhaul sub-frame wherein M is the number of symbols predefined for a switching time delay and N is the number of symbols used for PDCCH transmission of the relay node, and to perform a mapping of the rate-matched data symbols to the PDSCH region excluding the last M+N symbols.

According to further another aspect of the present invention, provided is a relay node in a relay based wireless communication system, the relay node including a sub-carrier symbol de-mapper configured to perform a de-mapping of sub-carrier reception symbols to a Reference Signal (RS) symbol, Physical Downlink Control CHannel (PDCCH) symbols and Physical Downlink Shared CHannel (PDSCH) symbols; a PDSCH symbol decoder configured to perform a decoding of the de-mapped PDSCH symbols; a PDCCH symbol decoder configured to perform a decoding of the de-mapped PDCCH symbols; an RS symbol based channel information generator configured to generate channel information depending on the de-mapped RS symbol; and a downlink physical channel symbol decoding and de-mapping controller configured to control all of the sub-carrier symbol de-mapper, the PDCCH symbol decoder, the PDSCH symbol decoder and the RS symbol based channel information generator to perform a de-mapping of data symbols in PDSCH regions excluding last M+N symbols of the scheduled downlink backhaul sub-frame wherein M is the number of symbols predefined for a switching time delay and N is the number of symbols used for PDCCH transmission of the relay node.

Therefore, aspects of this invention do not only eliminate an overlap of transmission and reception timing in a relay node due to an RF transmission/reception switching time delay, but also make better use of wireless backhaul resources and minimize an influence on conventional systems by offering the compatibility with conventional uplink and downlink sub-frame structures.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Non-limiting embodiments of the present invention will now be described more fully with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the following embodiments depend on a wireless communication system based on SC-FDMA and OFDM, especially 3GPP E-UTRA standardization, the present invention is not limited thereto. It will be understood by those skilled in the art that this invention may be favorably applied to any other communication systems having similar technical background and channel configuration.

Figure 1:
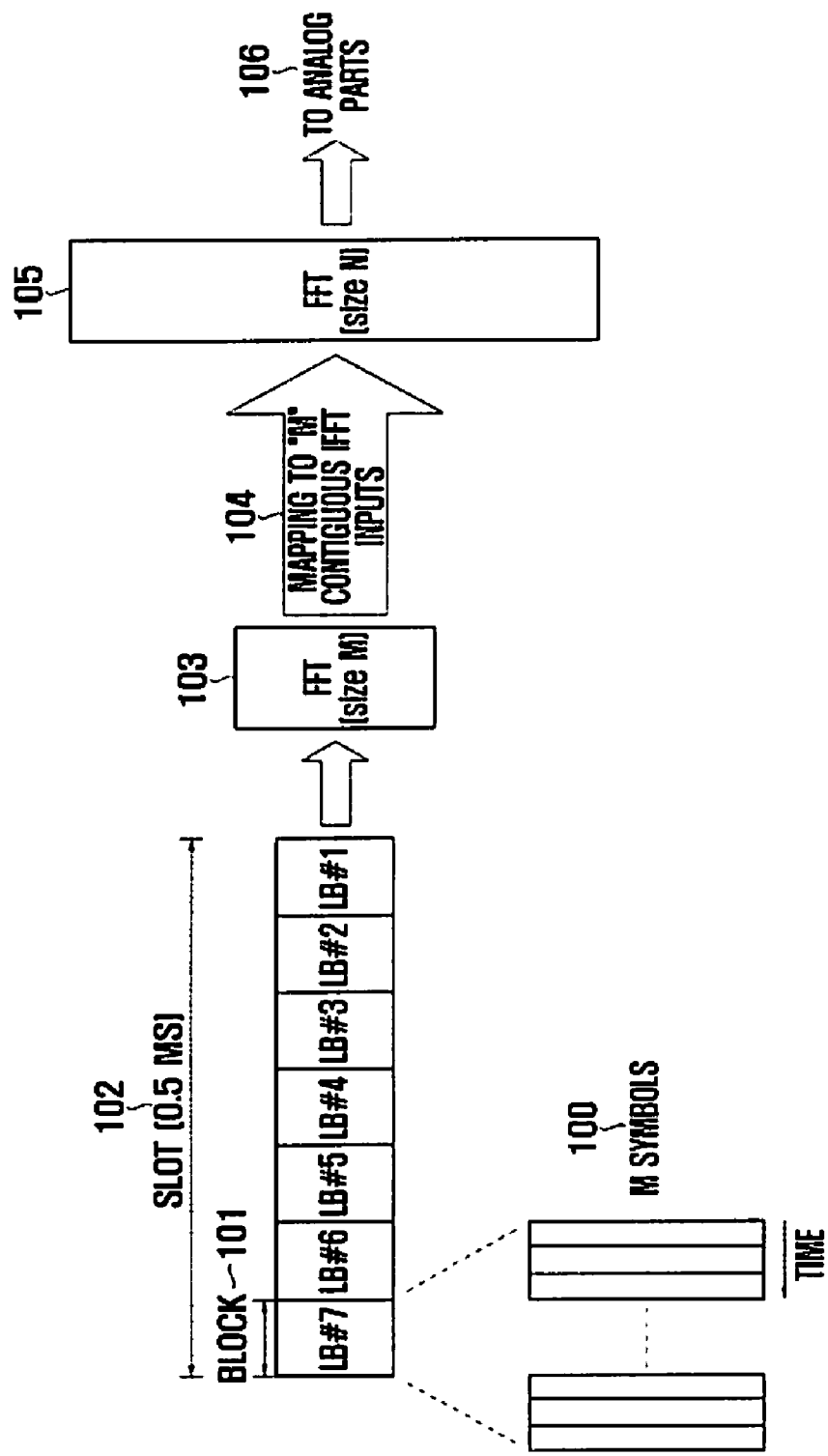
FIG. 1 is a diagram illustrating a structure of an SC-FDMA transmitter and a slot structure.

FIG. 1 is a diagram illustrating a structure of an SC-FDMA transmitter and a slot structure. Particularly, a transmitter shown in FIG. 1 is characterized by use of both a Fast Fourier Transform (FFT) device 103 and an Inverse FFT (IFFT) device 105.

Referring to FIG. 1, unlike an OFDM transmitter which includes only the IFFT device 105 used for multi-carrier transmission, the SC-FDMA transmitter further includes the FFT device 103 at the front of the IFFT device 105. M modulation symbols 100 constitute a single block, which is input into the FFT device 103 with a size M. Such a block is referred to as a Long Block (LB). A single slot 102 with 0.5 ms is composed of seven LBs. A LB becomes an SC-FDMA symbol after FFT, and seven SC-FDMA symbols constitute a slot with 0.5 ms.

Signals output from the FFT device 103 are offered as inputs 104 having contiguous indexes to the IFFT device 105 performing IFFT and then converted into analog signals 106. Normally an input/output size N of the IFFT device 105 is greater than an input/output size M of the FFT device 103. The reason for lower PAPR of SC-FDMA transmission signals in comparison with OFDM signals is that signals passing through both the FFT device 103 and the IFFT device 105 have single carrier properties.

Figure 2:
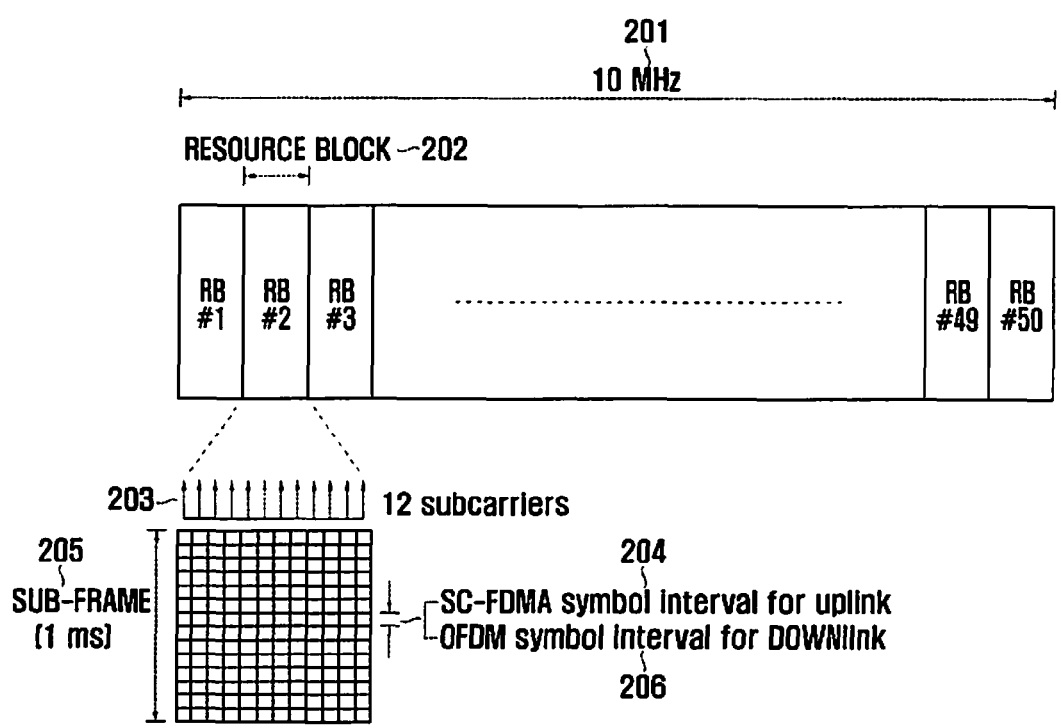
FIG. 2 is a diagram illustrating a frame structure of SC-FDMA based uplink and OFDM based downlink in the 3GPP E-UTRA.

FIG. 2 is a diagram illustrating a frame structure of SC-FDMA based uplink and OFDM based downlink in the 3GPP E-UTRA.

Referring to FIG. 2, there are fifty Resource Blocks (RBs) 202 in a system bandwidth 201 of 10 MHz. A single RB 202 is composed of twelve sub-carriers 203. The uplink has fourteen SC-FDMA symbol intervals 204, and the downlink has fourteen OFDM symbol intervals 206. Here, the SC-FDMA symbol interval 204 is identical to the OFDM symbol interval 206. Each RB 202 is the unit of scheduling for data transmission. Fourteen SC-FDMA symbols or OFDM symbols constitute a single sub-frame 205 with 1 ms.

Figure 3:
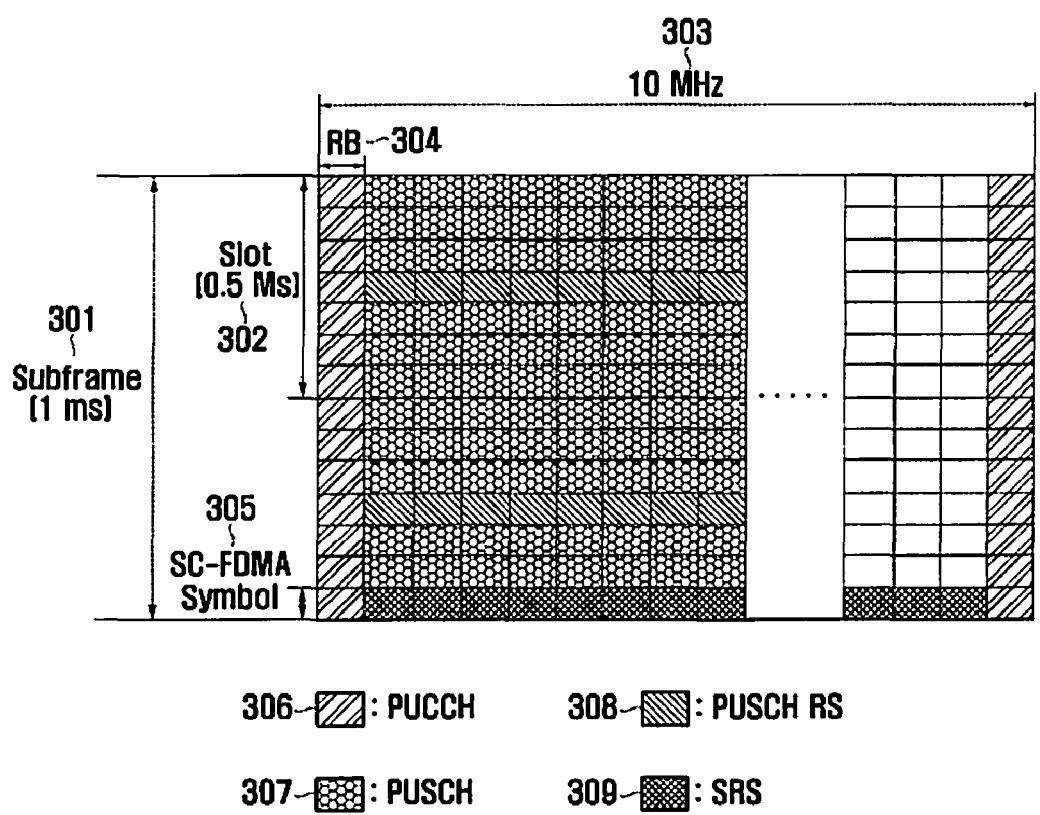
FIG. 3 is a diagram illustrating a resource allocation scheme for transmission of a control channel and a shared channel in SC-FDMA based uplink of the LTE system.

FIG. 3 is a diagram illustrating a resource allocation scheme for transmission of a control channel and a shared channel in SC-FDMA based uplink of the LTE system.

Referring to FIG. 3, a Physical Uplink Control CHannel (PUCCH) 306 is transmitted through RBs 304 located at both ends of a system band. A Sounding Reference Signal (SRS) 309 is transmitted through the entire 10 MHz band 303 at the last SC-FDMA symbol 305, and the orthogonality of the SRS is guaranteed for each user in a cell. A Physical Uplink Shared CHannel (PUSCH) 307 is transmitted through regions except the PUCCH and the SRS regions in a system band, and a Reference Signal (RS) 308 is transmitted through middle SC-FDMA symbols of each slot 302 in the PUSCH regions.

The PUCCH includes ACKnowledge/Negative ACKnowledge (ACK/NACK) information for a Hybrid Automatic Repeat reQuest (HARQ), Channel Quality Indication (CQI) information for scheduling of downlink data, etc. Also, the SRS is a signal for the acquisition of uplink channel condition information and the regulation of uplink transmission timing by users in the entire system band. Additionally, the RS is a signal for obtaining channel condition information used for demodulation and decoding of the PUSCH.

Figure 4:
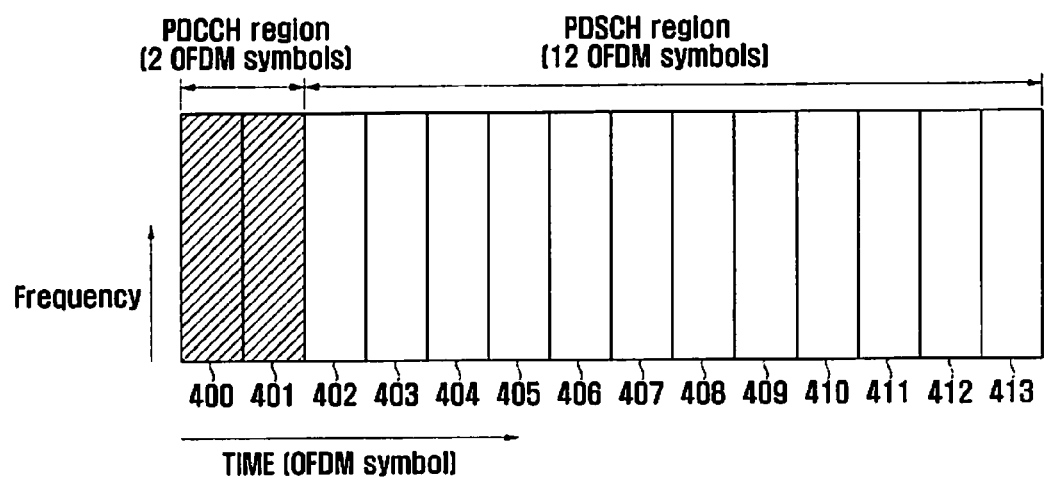
FIG. 4 is a diagram illustrating a resource allocation scheme for transmission of a control channel and a shared channel in OFDM based downlink of the LTE system.

FIG. 4 is a diagram illustrating a resource allocation scheme for transmission of a control channel and a shared channel in OFDM based downlink of the LTE system.

Referring to FIG. 4, a single sub-frame is composed of fourteen OFDM symbols 400 to 413. A region allocated to a Physical Downlink Control Channel (PDCCH) is located at the front of a sub-frame. At least one OFDM symbol 400 and at most three OFDM symbols 400 to 402 may be allocated to the PDCCH. In the case of the example shown in FIG. 4, two front OFDM symbols 400 and 401 are used for allocation of the PDCCH. Also, a region allocated to a Physical Downlink Shared CHannel (PDSCH) is the remaining twelve OFDM symbols 402 to 413.

The first OFDM symbol 400 of the PDCCH region is used to transmit a Physical Control Format Indicator CHannel (PCFICH) for informing the length of the PDCCH region and a Physical Hybrid ARQ Indicator CHannel (PHICH) for informing ACK/NACK information. Also, the PDCCH includes data allocation information and data Modulation and Coding Scheme (MCS) information. The reason that the PDCCH region is located at the front of a sub-frame is to allow user equipment to check first the PDCCH. If the PDCCH has no pertinent data allocation information, user equipment enters into a micro sleep mode to reduce power consumption in a data channel region. The RS used for demodulation and decoding of each channel is dispersed throughout the PDCCH region and the PDSCH region.

Uplink and downlink backhaul sub-frame structures in an L3 relay system will be described. In particular, discussed hereinafter are uplink and downlink backhaul sub-frame structures which may reduce a time delay due to an RF transmission/reception switching in an L3 relay system and may be compatible with a conventional SC-FDMA based uplink sub-frame structure and a conventional OFDM based downlink sub-frame structure.

THE FIRST EMBODIMENT

Figure 5:
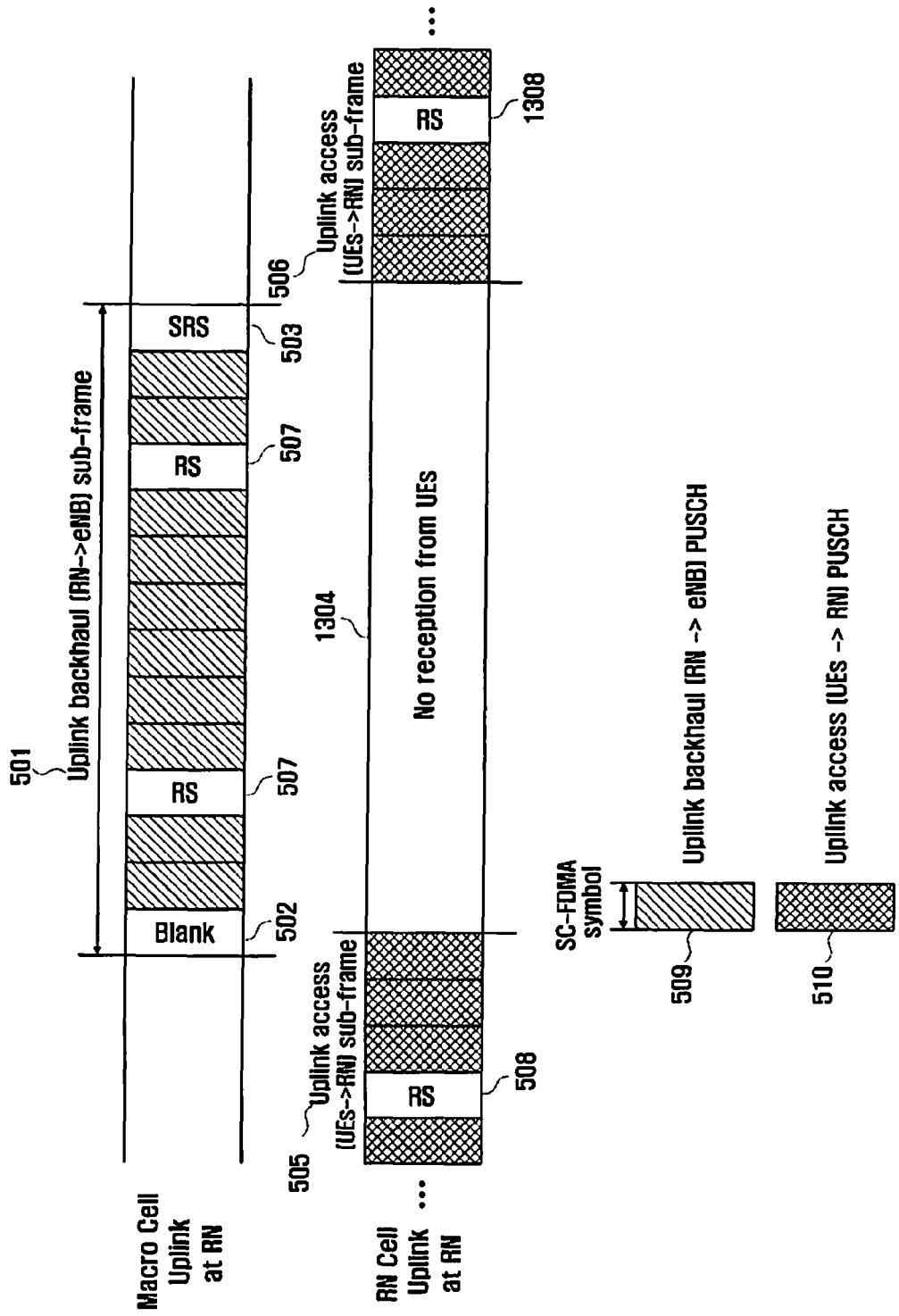
FIG. 5 is a diagram illustrating an uplink backhaul sub-frame structure in an L3 relay system in accordance with a first embodiment of the present invention.

FIG. 5 is a diagram illustrating an uplink backhaul sub-frame structure in an L3 relay system in accordance with the first embodiment of the present invention. Particularly, the first embodiment takes into consideration the case of allowing SRS transmission in an uplink backhaul sub-frame. The SRS is used for the regulation of transmission timing of a relay node. Also, channel condition information on frequency domain of a wireless backhaul link obtained through the SRS by a base station is used for scheduling of wireless backhaul resources.

Referring to FIG. 5, a reference number 501 indicates an uplink backhaul sub-frame region used for transmission from a Relay Node (RN) to a base station which is also referred to as e-Node-B (eNB) in 3GPP terminology. Since the relay node has no reception in the uplink backhaul sub-frame region 501, no uplink resources are allocated to User Equipment (UE) in a relay node cell as indicated by a reference number 504. Regions, except the uplink backhaul sub-frame region 501, correspond to uplink access sub-frame regions 505 and 506 of user equipment in the relay node cell. The relay node receives signals from user equipment in these regions 505 and 506.

The sync of the uplink backhaul sub-frame of the relay node coincides with the sync of the uplink access sub-frame of user equipment in a macro cell. Therefore, in order to maintain the orthogonality with SRS transmission of user equipment in the macro cell, SRS 503 in the uplink backhaul sub-frame should be located at the last SC-FDMA symbol as located in a normal sub-frame structure.

The configuration of PUSCH 509 and RS 507 in the uplink backhaul sub-frame follows that of conventional PUSCH 510 and RS 508 in order to allow uplink resource allocation of user equipment in the macro cell. Therefore, the PUSCH region 510 in the uplink access sub-frames 505 and 506 allows uplink resources of user equipment in the relay node cell to be transmitted through Frequency Division Multiplexing (FDM). Also, the PUSCH region 509 in the uplink backhaul sub-frame 501 allows uplink backhaul resources in the relay node and uplink resources of user equipment in the macro cell to be transmitted through FDM.

A switching from RF reception to RF transmission is required just before transmission of the uplink backhaul sub-frame, and a switching from RF transmission to RF reception is required just after transmission of the uplink backhaul sub-frame. A time delay due to these switching should be considered in the uplink backhaul sub-frame 501.

In the case of the first embodiment, while a proposed sub-frame structure is maintained, a time delay due to an RF transmission/reception switching is considered. Namely, the relay node abandons transmission of the first SC-FDMA symbol 502 of the uplink backhaul sub-frame 501 and then considers a switching time delay in the first SC-FDMA symbol 502 by postponing transmission timing of the uplink access sub-frame 506 by a switching time delay.

Figure 6:
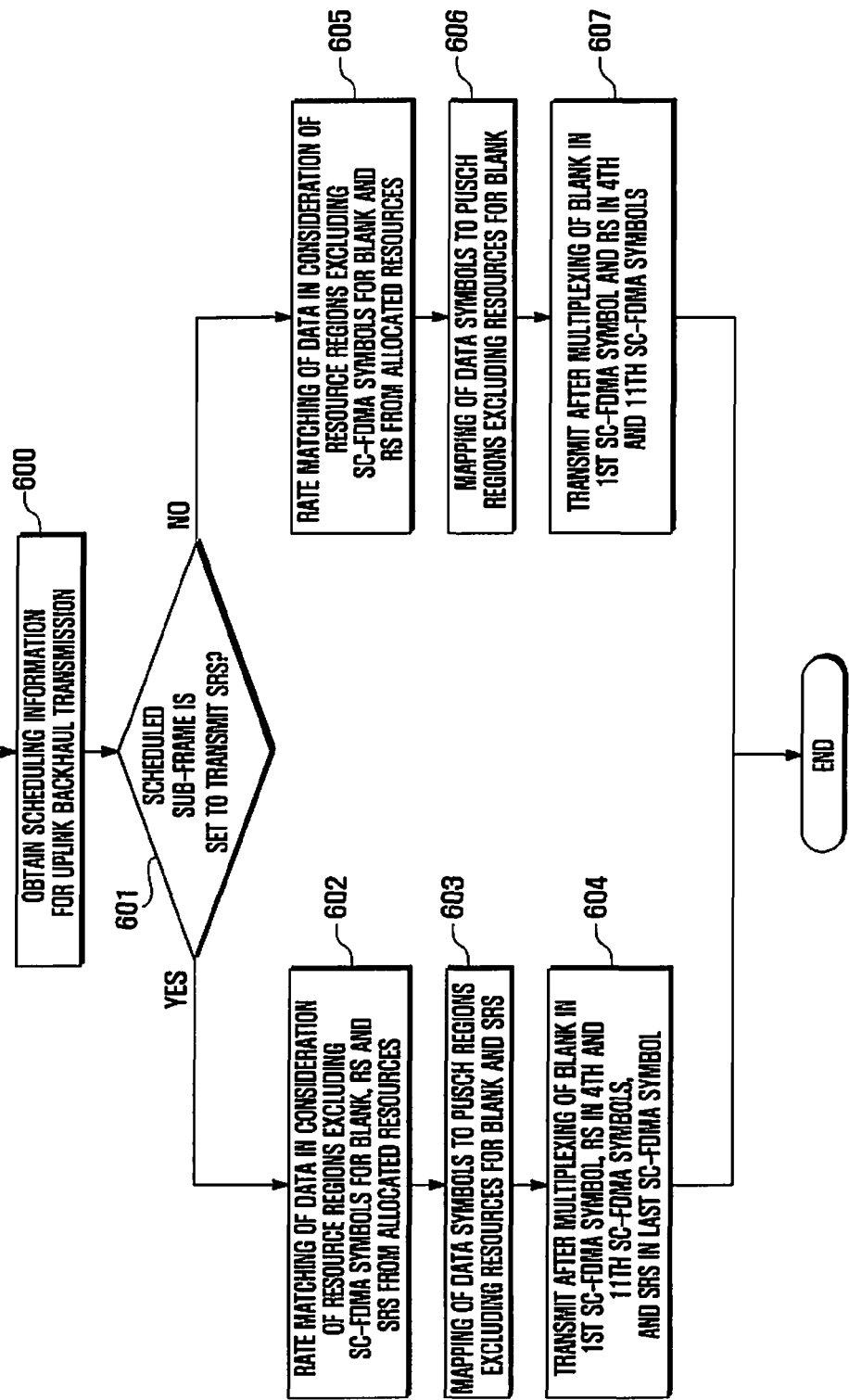
FIG. 6 is a flow diagram which illustrates a transmission process of a relay node for an uplink backhaul in an L3 relay system in accordance with the first embodiment of the present invention.

FIG. 6 is a flow diagram which illustrates a transmission process of a relay node for an uplink backhaul in an L3 relay system in accordance with the first embodiment of the present invention.

Referring to FIG. 6, the relay node obtains scheduling information for uplink backhaul transmission from the base station in step 600. This scheduling information may be obtained through a control channel of downlink backhaul transmitted from the base station to the relay node. The relay node determines whether a scheduled uplink backhaul sub-frame is set to transmit an SRS in step 601. This step is required because the PUSCH region of a sub-frame having an SRS is different from that of a sub-frame having no SRS. Namely, the last SC-FDMA symbol is excluded from the PUSCH region in the case of a sub-frame with the SRS, whereas the last SC-FDMA symbol is included in the PUSCH region in case of a sub-frame without the SRS.

If a scheduled uplink backhaul sub-frame is set to transmit the SRS, the relay node performs a rate matching of data in consideration of resource regions excluding SC-FDMA symbols for blank, the RS and the SRS from allocated RB resources in step 602. Also, the relay node performs a mapping of rate-matched data symbols to resource regions excluding the first SC-FDMA symbol for blank, the fourth and eleventh SC-FDMA symbols for the RS, and the last SC-FDMA symbol for the SRS in step 603. Thereafter, the relay node performs a multiplexing of blank in the first SC-FDMA symbol, a multiplexing of the RS in the fourth and eleventh SC-FDMA symbols, and a multiplexing of the SRS in the last SC-FDMA symbol, and then performs transmission to the base station in step 604.

If a scheduled uplink backhaul sub-frame is set not to transmit the SRS, the relay node performs a rate matching of data in consideration of resource regions excluding SC-FDMA symbols for blank and the RS from allocated RB resources in step 605. Also, the relay node performs a mapping of rate-matched data symbols to resource regions excluding the first SC-FDMA symbol for blank, and the fourth and eleventh SC-FDMA symbols for the RS in step 606. Thereafter, the relay node performs a multiplexing of blank in the first SC-FDMA symbol, and a multiplexing of RS in the fourth and eleventh SC-FDMA symbols, and then performs transmission to the base station in step 607.

Figure 7:
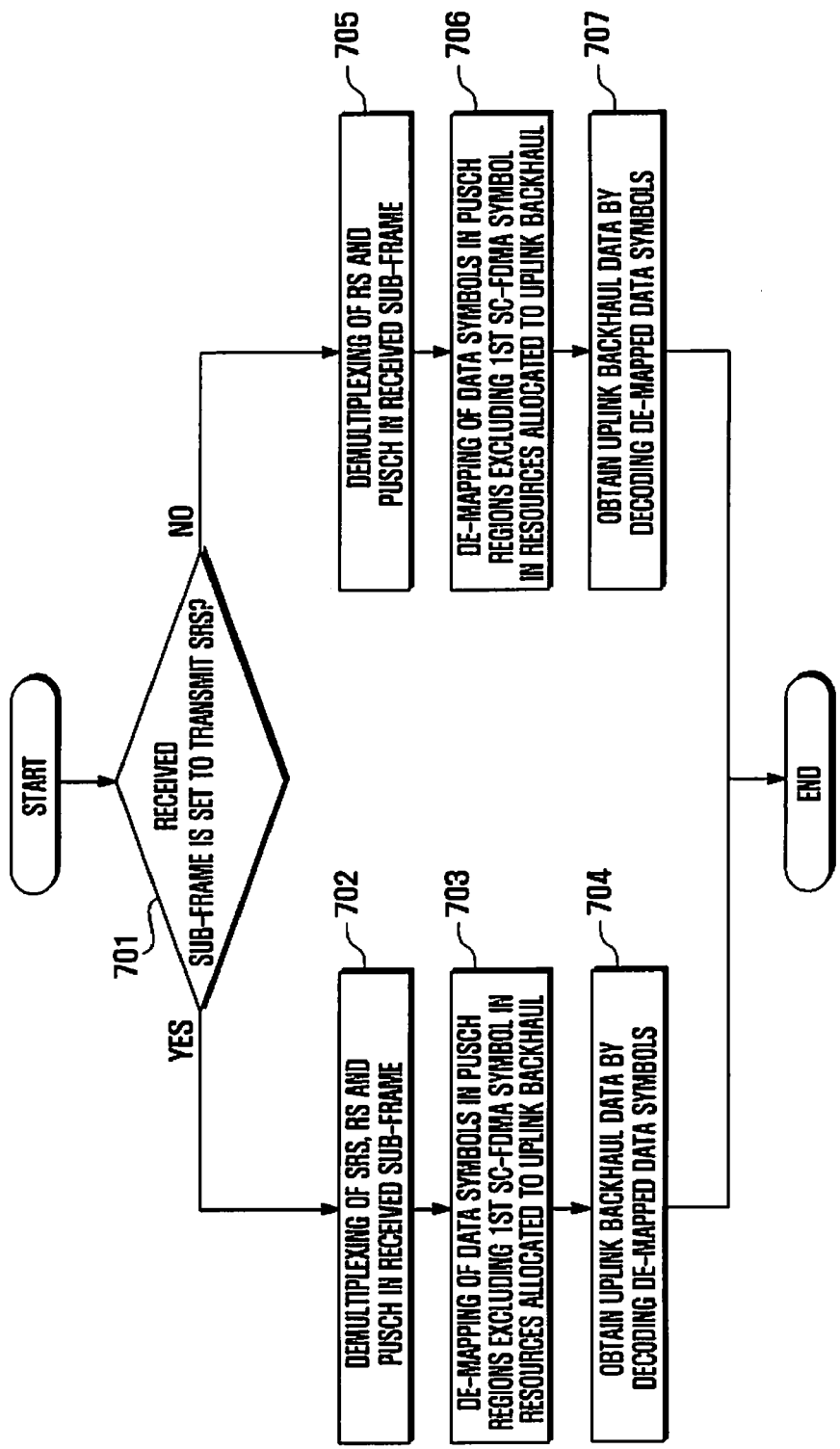
FIG. 7 is a flow diagram which illustrates a reception process of a base station for an uplink backhaul in an L3 relay system in accordance with a first embodiment of the present invention.

FIG. 7 is a flow diagram which illustrates a reception process of a base station for an uplink backhaul in an L3 relay system in accordance with the first embodiment of the present invention.

Referring to FIG. 7, the base station determines whether a received sub-frame is set to transmit SRS in step 701. If a received sub-frame is set to transmit the SRS, the base station performs a demultiplexing of the SRS, the RS and the PUSCH in a received sub-frame in step 702. Also, the base station performs a de-mapping of data symbols in PUSCH regions excluding the first SC-FDMA symbol in RBs allocated to uplink backhaul in step 703. Thereafter, the base station obtains uplink backhaul data by decoding de-mapped data symbols in step 704.

If a received sub-frame is set not to transmit the SRS, the base station performs a demultiplexing of the RS and the PUSCH in a received sub-frame in step 705. The base station performs a de-mapping of data symbols in PUSCH regions excluding the first SC-FDMA symbol in the RBs allocated to uplink backhaul in step 706. Then the base station obtains uplink backhaul data by decoding de-mapped data symbols in step 707.

Although the first embodiment employs a single SC-FDMA symbol for blank, two or more SC-FDMA symbols for blank may be also employed according to parameters related to an RF transmission/reception switching time delay and timing regulation.

THE SECOND EMBODIMENT

Figure 8:
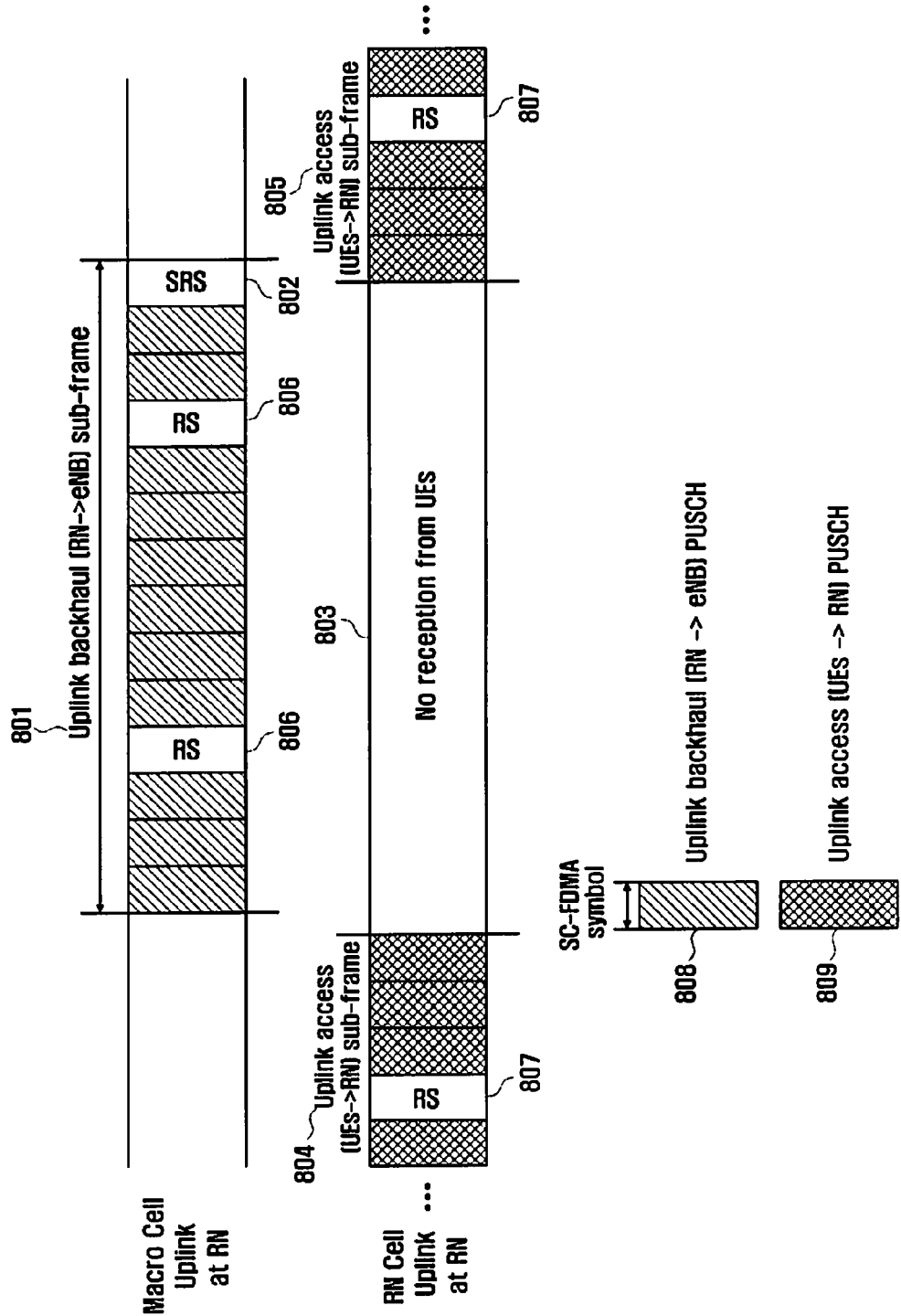
FIG. 8 is a diagram illustrating an uplink backhaul sub-frame structure in an L3 relay system in accordance with a second embodiment of the present invention.

FIG. 8 is a diagram illustrating an uplink backhaul sub-frame structure in an L3 relay system in accordance with the second embodiment of the present invention. Particularly, the second embodiment is limited to the case where an uplink backhaul sub-frame does not transmit the SRS.

Referring to FIG. 8, a reference number 801 indicates an uplink backhaul sub-frame region used for transmission from the Relay Node (RN) to the base station (e.g. eNB). Since the relay node has no reception in the uplink backhaul sub-frame region 801, no uplink resources are allocated to User Equipment (UE) in a relay node cell as indicated by a reference number 803. Regions except the uplink backhaul sub-frame region 801 correspond to uplink access sub-frame regions 804 and 805 of user equipment in the relay node cell. The relay node receives signals from user equipment in these regions 804 and 805.

Since the sync of the uplink backhaul sub-frame of the relay node coincides with the sync of the uplink access sub-frame of user equipment in the macro cell, the configuration of PUSCH 808 and RS 806 in the uplink backhaul sub-frame employs that of conventional PUSCH 809 and RS 807 in order to allow uplink resource allocation of user equipment in the macro cell. Therefore, the PUSCH region 809 in the uplink access sub-frames 804 and 805 allows uplink resources of user equipment in the relay node cell to be transmitted through FDM. Also, the PUSCH region 808 in the uplink backhaul sub-frame 801 allows uplink backhaul resources in the relay node and uplink resources of user equipment in the macro cell to be transmitted through FDM.

A switching from RF reception to RF transmission is required just before transmission of the uplink backhaul sub-frame, and another switching from RF transmission to RF reception is required just after transmission of the uplink backhaul sub-frame. Also, a time delay due to these switchings should be considered in the uplink backhaul sub-frame 801. Unlike the first embodiment, transmission of the last SC-FDMA symbol 802 is abandoned in the second embodiment. This is to prevent a conflict between uplink backhaul data and the SRS of user equipment in the macro cell because the sync of the uplink backhaul sub-frame of the relay node coincides with the sync of the uplink access sub-frame of user equipment in the macro cell and because the uplink backhaul sub-frame does not transmit the SRS.

In such a case of abandoning transmission of the last SC-FDMA symbol, the relay node considers a switching time delay in the last SC-FDMA symbol 802 of the uplink backhaul sub-frame 801 by advancing the transmission timing of the uplink access link by a switching time delay.

In the second embodiment, a transmission process of the relay node corresponds to the aforesaid steps 605 to 607 in the case of a sub-frame with no SRS transmission in FIG. 6. Additionally, a reception process of the base station corresponds to the aforesaid steps 705 to 707 in the case of a sub-frame with no SRS transmission in FIG. 7. Unlike the first embodiment, steps 606, 607 and 706 in the second embodiment employ the last SC-FDMA symbol for blank. Although the second embodiment employs a single SC-FDMA symbol for blank, two or more SC-FDMA symbols for blank may be also employed according to parameters related to an RF transmission/reception switching time delay and timing regulation.

THE THIRD EMBODIMENT

Figure 9:
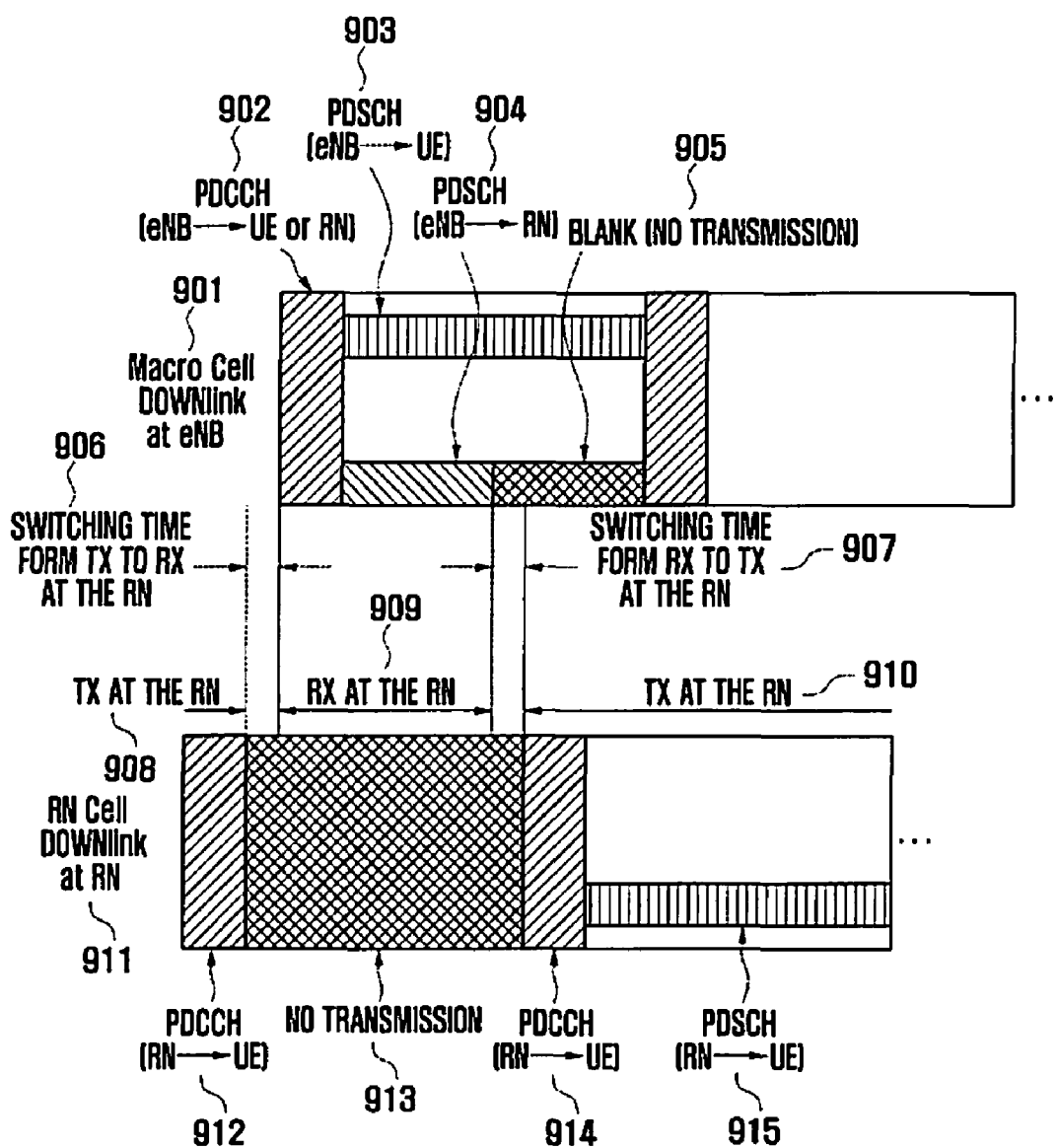
FIG. 9 is a diagram illustrating a downlink backhaul sub-frame structure in an L3 relay system in accordance with a third embodiment of the present invention.

FIG. 9 is a diagram illustrating a downlink backhaul sub-frame structure in an L3 relay system in accordance with the third embodiment of the present invention.

Referring to FIG. 9, the Relay Node (RN) sends PDCCH 912 to User Equipment (UE) in the relay node cell just before receiving a downlink backhaul sub-frame from the base station (e.g. eNB). Also, the base station may transmit the downlink backhaul sub-frame by performing a Frequency Division Multiplexing (FDM) for PDCCH 902 and PDSCH 903 of user equipment in the macro cell. This structure is for the purpose of maintaining the compatibility with conventional LTE systems.

In the third embodiment as well, RF transmission/reception switching time delays 906 and 907 are invoked respectively just before and just after reception of the downlink backhaul sub-frame. In order to apply such a switching time delay to the backhaul sub-frame, the base station does not use the last OFDM symbol in transmission of the downlink backhaul.

Additionally, since a backhaul reception region at the relay node is a PDSCH region 913 just after transmission of a PDCCH region 912 at the relay node, the last OFDM symbol region set as blank by the base station should consider the PDCCH region 912 transmitted by the relay node as well as the aforesaid switching time delay. Namely, resources that the base station does not use for resource allocation to the downlink backhaul sub-frame are N+1 OFDM symbols which include one OFDM symbol for a switching time delay and N OFDM symbols used for transmission of the PDCCH 912 at the relay node. This is applied to the last OFDM symbol 905 of backhaul resources in the downlink backhaul sub-frame. Here, the length of the PDCCH region 912 transmitted by the relay node may be fixed or varied through superior signals. As shown in FIG. 9, the relay node may regulate timing with user equipment in the relay node cell, depending on reception timing of the downlink backhaul sub-frame.

Figure 10:
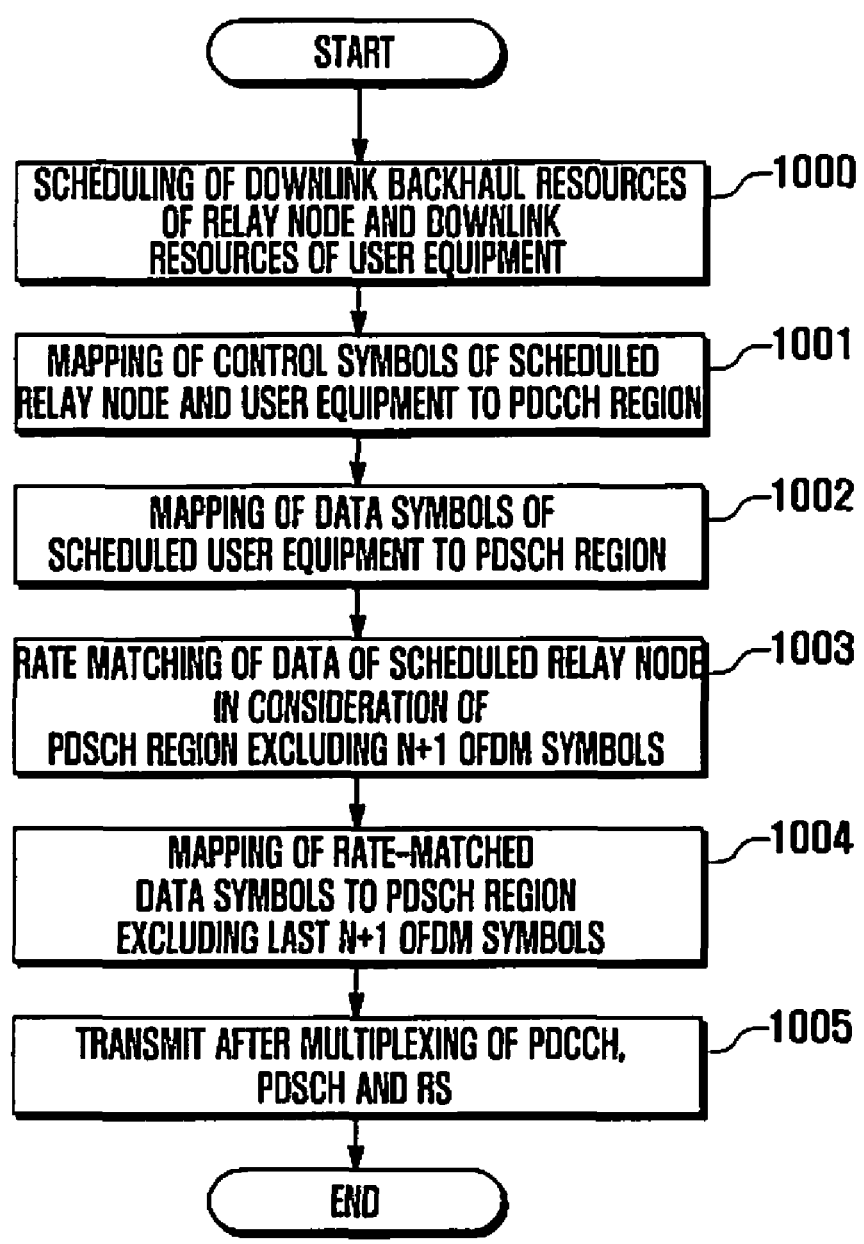
FIG. 10 is a flow diagram which illustrates a transmission process of a base station for a downlink backhaul in an L3 relay system in accordance with the third embodiment of the present invention.

FIG. 10 is a flow diagram which illustrates a transmission process of a base station for a downlink backhaul in an L3 relay system in accordance with the third embodiment of the present invention.

Referring to FIG. 10, the base station performs a scheduling of resources for the downlink backhaul sub-frame of the relay node and a scheduling of the downlink resources of user equipment in the macro cell in step 1000. The base station performs a mapping of control symbols of scheduled relay node and user equipment to the PDCCH region in step 1001, and then performs a mapping of data symbols of scheduled user equipment to the PDSCH region in step 1002.

Thereafter, the base station performs a rate matching of the data of a scheduled relay node in consideration of the PDSCH region excluding N+1 OFDM symbols in step 1003. The base station performs a mapping of the rate-matched data symbols to the PDSCH region excluding the last N+1 OFDM symbols in step 1004. The base station then performs a multiplexing of PDCCH, PDSCH and RS of the relay node and user equipment, and then performs transmission to the relay node in step 1005.

Figure 11:
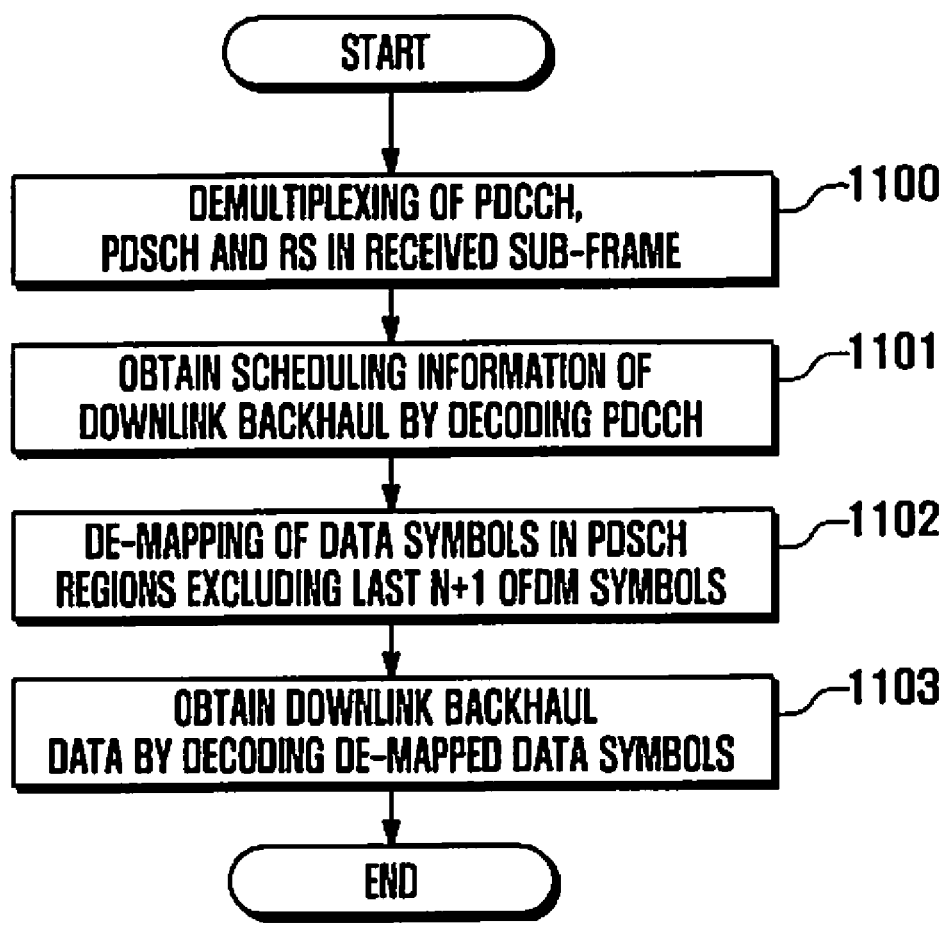
FIG. 11 is a flow diagram which illustrates a reception process of a relay node for a downlink backhaul in an L3 relay system in accordance with the third embodiment of the present invention.

FIG. 11 is a flow diagram which illustrates a reception process of a relay node for a downlink backhaul in an L3 relay system in accordance with the third embodiment of the present invention.

Referring to FIG. 11, the relay node performs a demultiplexing of PDCCH, PDSCH and RS in the downlink backhaul sub-frame received from the base station in step 1100. Then the relay node obtains scheduling information (i.e. resource allocation information and a level of modulation and encoding) of the downlink backhaul by decoding pertinent PDCCH in step 1101. The relay node performs a de-mapping of data symbols in allocated PDSCH regions excluding the last N+1 OFDM symbols in step 1102. Thereafter, the relay node obtains downlink backhaul data by decoding de-mapped data symbols in step 1103.

Although the third embodiment employs a single OFDM symbol for blank in consideration of an RF transmission/reception switching time delay, two or more OFDM symbols for blank may be also employed according to parameters related to timing regulation.

THE FOURTH EMBODIMENT

Figure 12:
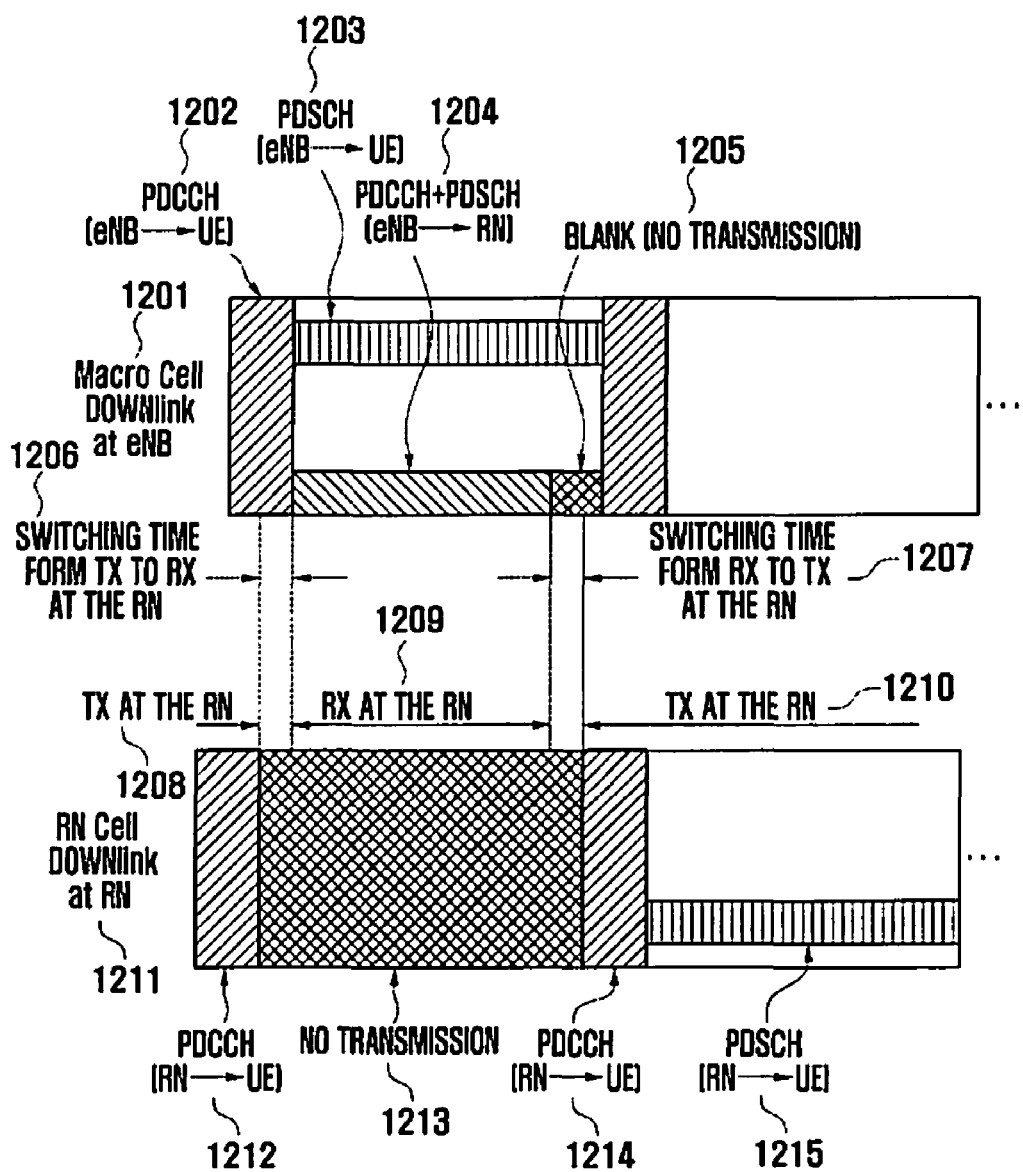
FIG. 12 is a diagram illustrating a downlink backhaul sub-frame structure in an L3 relay system in accordance with a fourth embodiment of the present invention.

FIG. 12 is a diagram illustrating a downlink backhaul sub-frame structure in an L3 relay system in accordance with the fourth embodiment of the present invention. Unlike the third embodiment, the fourth embodiment considers another structure which allows both PDCCH and PDSCH 1204 of downlink backhaul to be transmitted together through a conventional PDSCH region in the downlink backhaul sub-frame. Namely, a conventional PDCCH region 1202 in the downlink backhaul sub-frame is used to transmit PDCCH only of user equipment in the macro cell. Additionally, PDCCH associated with downlink backhaul is mapped to a PDSCH region through TDM and FDM in the PDSCH region or joint coding with the PDSCH. In order to realize this structure, the base station should notify, in advance, backhaul resource regions to the relay node through superior signals.

Referring to FIG. 12, the Relay Node (RN) sends PDCCH 1212 to User Equipment (UE) in the relay node cell just before receiving a downlink backhaul sub-frame from the base station (e.g. eNB). The base station may transmit the downlink backhaul sub-frame by performing a Frequency Division Multiplexing (FDM) for PDCCH 1202 and PDSCH 1203 of the user equipment in the macro cell. This structure is for the purpose of maintaining compatibility with conventional LTE systems.

In the fourth embodiment as well, RF transmission/reception switching time delays 1206 and 1207 are invoked, respectively, just before and just after reception of downlink backhaul resources. In order to apply such a switching time delay to the backhaul sub-frame, the base station does not use the last OFDM symbol in the transmission of the downlink backhaul. Unlike the third embodiment, the relay node in the fourth embodiment does not need to receive PDCCH 1202 from the base station. So a reception start timing of the relay node becomes the PDSCH start timing of the downlink backhaul sub-frame. Since there is no need of considering blank of N OFDM symbols in the third embodiment, the last OFDM symbol for blank is set only in consideration of the aforesaid switching time delay. Such a blank resource is applied to the last OFDM symbol 1205 of backhaul RB resources in the downlink backhaul sub-frame.

As shown in FIG. 12, the relay node may regulate transmission timing with user equipment in the relay node cell, depending on reception timing of the downlink backhaul sub-frame from the base station.

A transmission process of the base station according to the fourth embodiment may be realized when the PDCCH and the PDSCH of the downlink backhaul are mapped together with a conventional PDSCH region in the aforesaid step 1001 in FIG. 10 and when the last OFDM only is used for blank in the aforesaid steps 1003 and 1004.

Additionally, a reception process of the relay node according to the fourth embodiment may be realized when the PDCCH of the downlink backhaul is obtained from resources earlier allocated for the downlink backhaul in the aforesaid step 1100 in FIG. 11, namely, from a conventional PDSCH region, and when the last OFDM only is used for blank in the aforesaid step 1102.

Although the fourth embodiment employs a single OFDM symbol for blank in view of an RF transmission/reception switching time delay, two or more OFDM symbols for blank may be also employed according to parameters related to timing regulation.

THE FIFTH EMBODIMENT

Figure 13:
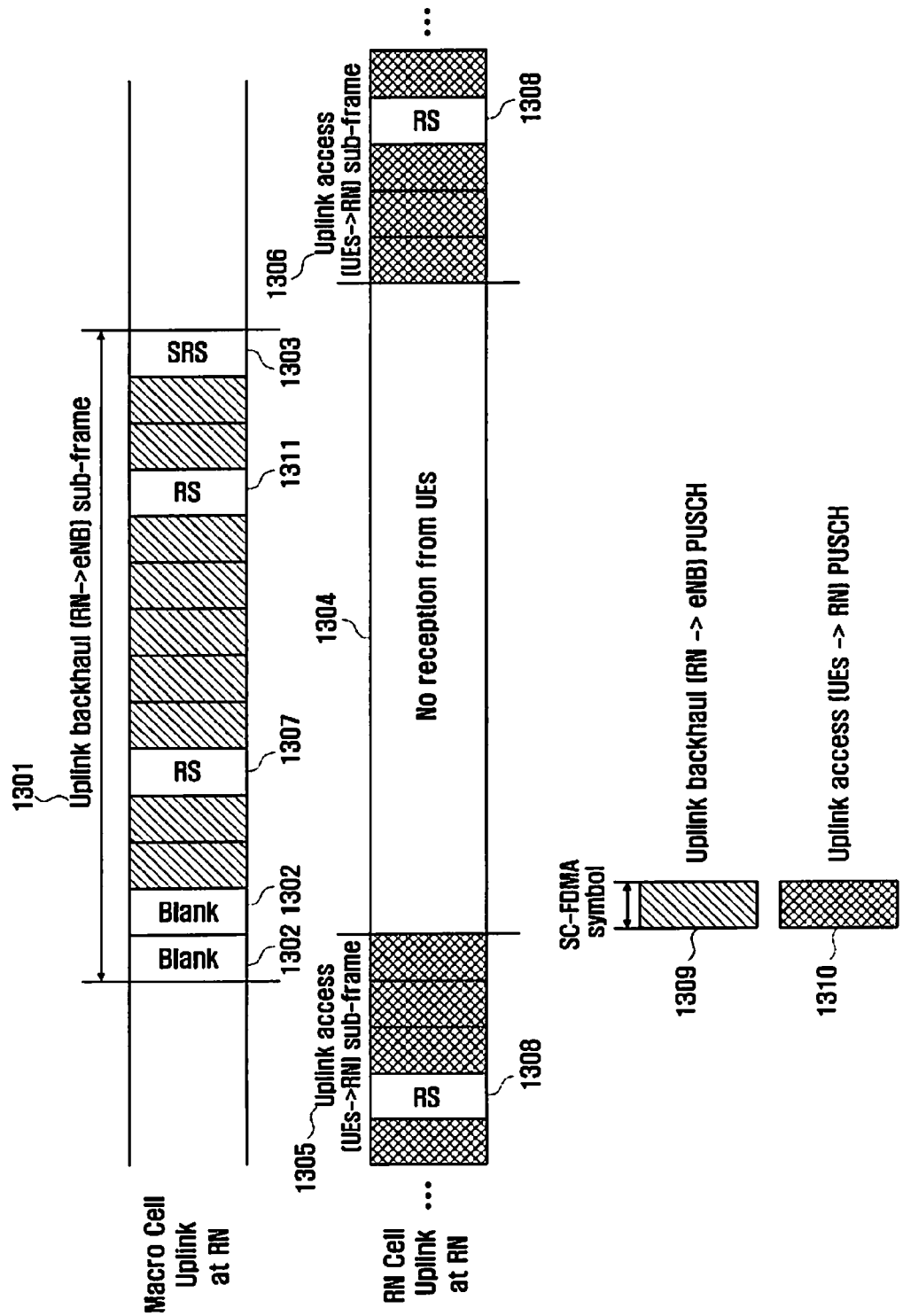
FIG. 13 is a diagram illustrating an uplink backhaul sub-frame structure in an L3 relay system in accordance with a fifth embodiment of the present invention.

FIG. 13 is a diagram illustrating an uplink backhaul sub-frame structure in an L3 relay system in accordance with the fifth embodiment of the present invention. Particularly, like the first embodiment, the fifth embodiment allows SRS transmission in an uplink backhaul sub-frame. The SRS is used for the regulation of transmission timing of a relay node. Also, channel condition information on frequency domain of a wireless backhaul link obtained through the SRS by a base station is used for scheduling of wireless backhaul resources.

Referring to FIGS. 5 and 13, the relay node in the first embodiment considers a switching time delay in the first SC-FDMA symbol region 502 of the uplink backhaul sub-frame 501 by postponing transmission timing of the uplink access sub-frame 506 by such a switching time delay. The relay node in the fifth embodiment abandons transmission of the first and second SC-FDMA symbols 1302 of the uplink backhaul sub-frame 1301 in order to consider changes in transmission timing of the uplink backhaul sub-frame according to changes in reception timing of the downlink backhaul sub-frame as well as a switching time delay.

If a shift of RS symbol locations is allowed in the uplink backhaul sub-frame structure, an RS symbol located at the fourth SC-FDMA symbol (507 in FIG. 5) may be shifted to the fifth SC-FDMA symbol 1307 in order to reduce channel estimation errors in PUSCH 1309 located from the third symbol.

Since the Relay Node (RN) has no reception in the uplink backhaul sub-frame region 1301 transmitted to the base station (e.g. eNB), no uplink resources 1304 are allocated to User Equipment (UE) in a relay node cell. The relay node receives signals from user equipment in uplink access sub-frame regions 1305 and 1306 of user equipment in the relay node cell except the uplink backhaul sub-frame region 1301.

Additionally, the sync of the uplink backhaul sub-frame of the relay node coincides with the sync of the uplink access sub-frame of user equipment in a macro cell. Therefore, in order to maintain the orthogonality with the SRS transmission of user equipment in the macro cell, SRS 1303 in the uplink backhaul sub-frame should be located at the last SC-FDMA symbol as located in a normal sub-frame structure.

The PUSCH region 1310 in the uplink access sub-frames 1305 and 1306 allows uplink resources of user equipment in the relay node cell to be transmitted through FDM. Also, the PUSCH region 1309 in the uplink backhaul sub-frame 1301 allows uplink backhaul resources in the relay node and uplink resources of user equipment in the macro cell to be transmitted through FDM.

A switching from RF reception to RF transmission is required just before transmission of the uplink backhaul sub-frame, and a switching from RF transmission to RF reception is required just after transmission of the uplink backhaul sub-frame. A time delay due to these switchings should be considered in the uplink backhaul sub-frame 1301. Also, the transmission timing of the uplink backhaul sub-frame may be changed according to reception timing of the downlink backhaul sub-frame. Therefore, such timing changes should be further considered.

In the case of the fifth embodiment, while the sub-frame structure is maintained, changes in transmission timing of the uplink backhaul sub-frame according to changes in reception timing of the downlink backhaul sub-frame are considered together with an RF transmission/reception switching time delay. Namely, the relay node abandons transmission of the first and second SC-FDMA symbols 1302 of the uplink backhaul sub-frame 1301 and then considers a switching time delay in the first and second SC-FDMA symbols 1302 and changes in transmission timing of the uplink backhaul sub-frame by postponing transmission timing of the uplink access sub-frame by a single SC-FDMA symbol.

Figure 14:
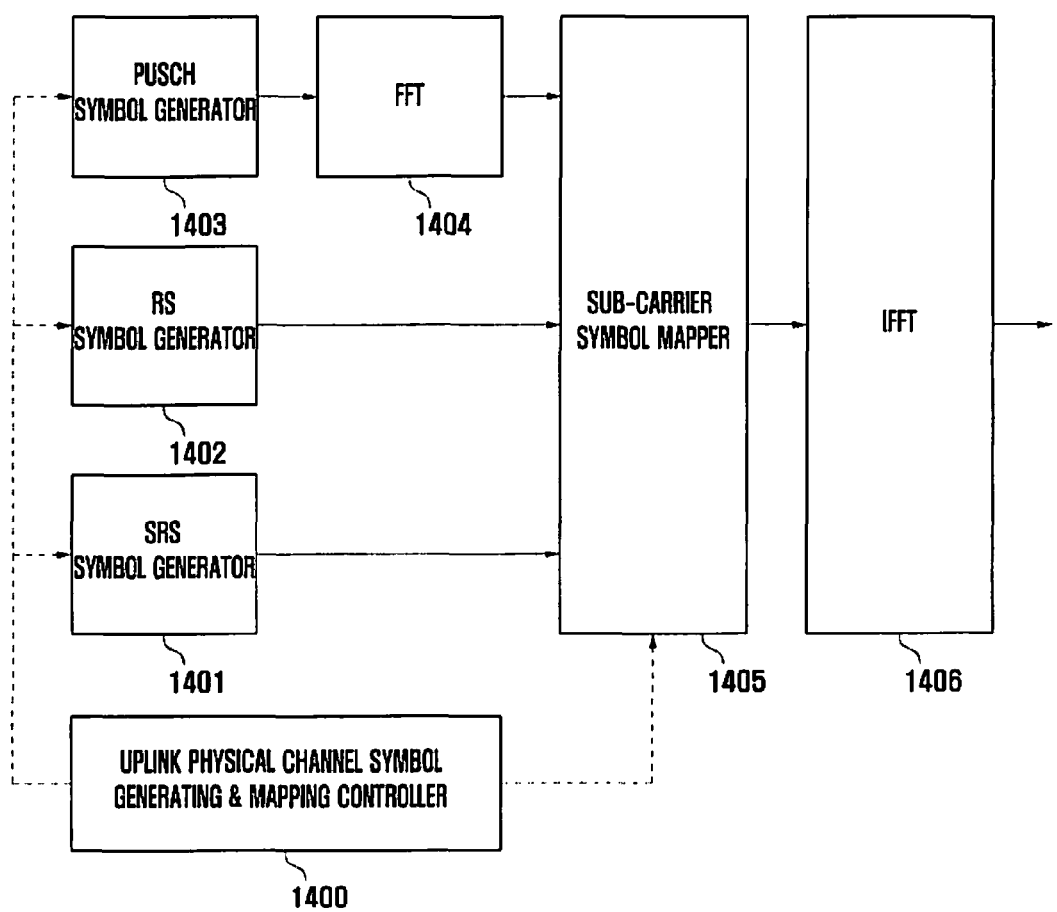
FIG. 14 is a block diagram which illustrates a transmission apparatus for an uplink backhaul sub-frame of a relay node in accordance with one embodiment of the present invention.

FIG. 14 is a block diagram which illustrates a transmission apparatus for an uplink backhaul sub-frame of a relay node in accordance with one embodiment of the present invention.

Referring to FIG. 14, a relay node transmitter includes an SRS symbol generator 1401, an RS symbol generator 1402 and a PUSCH symbol generator 1403 which generate the SRS, the RS and the PUSCH symbols, respectively. The SRS and RS symbols are directly input into a sub-carrier symbol mapper 1405, and the PUSCH symbol is input into the sub-carrier symbol mapper 1405 through an FFT device 1404. The output of the sub-carrier symbol mapper 1405 is mapped with the input of an IFFT device 1406. An uplink physical channel symbol generating and mapping controller 1400 controls the PUSCH symbol generator 1403 to perform a rate matching in consideration of SC-FDMA symbol for blank, and also controls the sub-carrier symbol mapper 1405 to perform an exact mapping of the PUSCH symbol with regions excluding the SC-FDMA symbol for blank. The SRS symbol generator 1401 may be optional depending on the structure of the uplink backhaul sub-frame.

Figure 15:
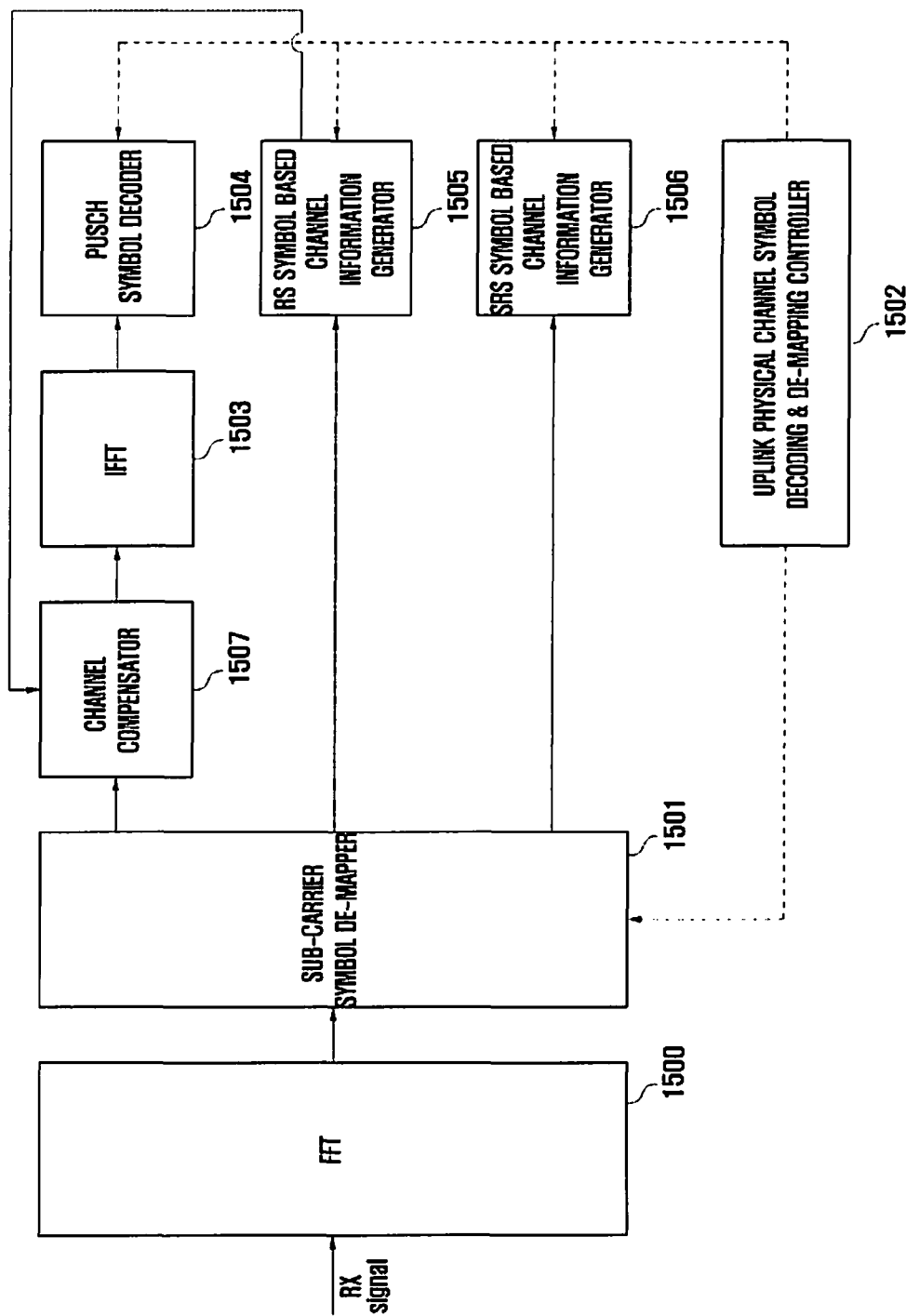
FIG. 15 is a block diagram which illustrates a reception apparatus for an uplink backhaul sub-frame of a base station in accordance with another embodiment of the present invention.

FIG. 15 is a block diagram which illustrates a reception apparatus for an uplink backhaul sub-frame of a base station in accordance with another embodiment of the present invention.

Referring to FIG. 15, an FFT device 1500 performs fast Fourier transform of received uplink SC-FDMA signals and outputs respective sub-carrier reception symbols. These reception symbols are classified into PUSCH, RS and SRS symbols by a sub-carrier symbol de-mapper 1501. The RS symbol is input into an RS symbol based channel information generator 1505, which offers channel condition information associated with the PUSCH symbol to a channel compensator 1507 which performs channel compensation of the PUSCH symbol inputted from the sub-carrier symbol de-mapper 1501.

The PUSCH symbol, after channel compensation, is converted into a data symbol suitable for decoding in an IFFT device 1503 and then offered to a PUSCH symbol decoder 1504. An SRS symbol based channel information generator 1506 receives the SRS symbol from the sub-carrier symbol de-mapper 1501 and then generates channel information. This channel information is used for scheduling of uplink backhaul resources at the base station.

An uplink physical channel symbol decoding and de-mapping controller 1502 controls the sub-carrier symbol de-mapper 1501 to perform a de-mapping of PUSCH in consideration of SC-FDMA symbol for blank, and also controls the PUSCH symbol decoder 1504, the RS symbol based channel information generator 1505 and the SRS symbol based channel information generator 1506. The SRS symbol based channel information generator 1506 may be optional depending on the structure of the uplink backhaul sub-frame.

Figure 16:
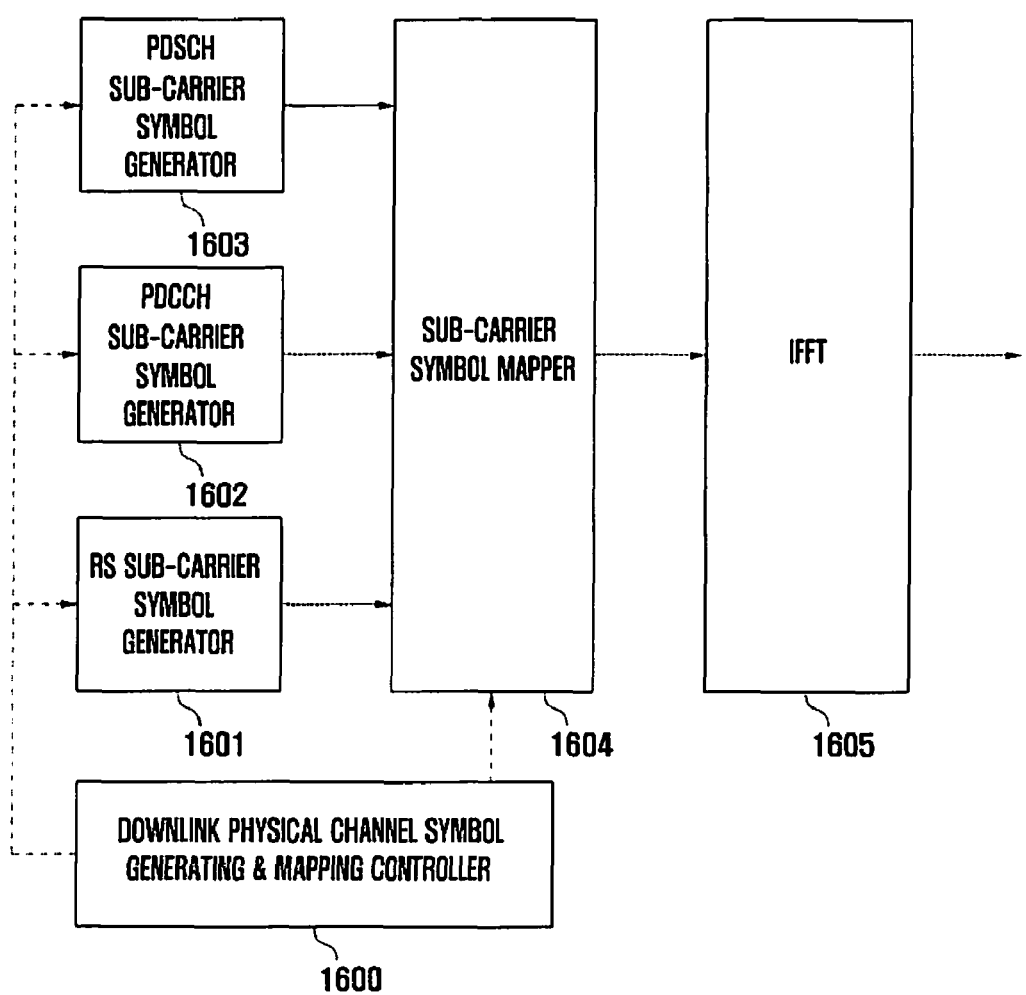
FIG. 16 is a block diagram which illustrates a transmission apparatus for a downlink backhaul sub-frame of a base station in accordance with still another embodiment of the present invention.

FIG. 16 is a block diagram which illustrates a transmission apparatus for a downlink backhaul sub-frame of a base station in accordance with still another embodiment of the present invention.

Referring to FIG. 16, a base station transmitter includes an RS symbol generator 1601, a PDCCH sub-carrier symbol generator 1602 and a PDSCH sub-carrier symbol generator 1603 which generate sub-carrier symbols of the RS, PDCCH and PDSCH channels, respectively. The generated symbols are input into a sub-carrier symbol mapper 1604 and mapped with the input of an IFFT device 1605.

A downlink physical channel symbol generating and mapping controller 1600 controls the sub-carrier symbol mapper 1604 to perform an exact mapping of the aforesaid channel symbols in a corresponding sub-frame. Additionally, the downlink physical channel symbol generating and mapping controller 1600 controls the PUSCH sub-carrier symbol generator 1603 to perform a rate matching of data in consideration of the OFDM symbol for blank, and also controls the sub-carrier symbol mapper 1604 to perform a mapping in consideration of the OFDM symbol for blank.

In the case of another structure where PDCCH transmitted to the relay node in the downlink backhaul sub-frame uses the PDSCH region, the downlink physical channel symbol generating and mapping controller 1600 may control the sub-carrier symbol mapper 1604 to perform a mapping of both PDCCH and PDSCH to the PDSCH region. Also, the downlink physical channel symbol generating and mapping controller 1600 may control the PUSCH sub-carrier symbol generator 1603 to perform a joint coding of the PDCCH and the PDSCH and then may control the sub-carrier symbol mapper 1604 to perform a mapping of the joint coded symbol to the PDSCH region.

Figure 17:
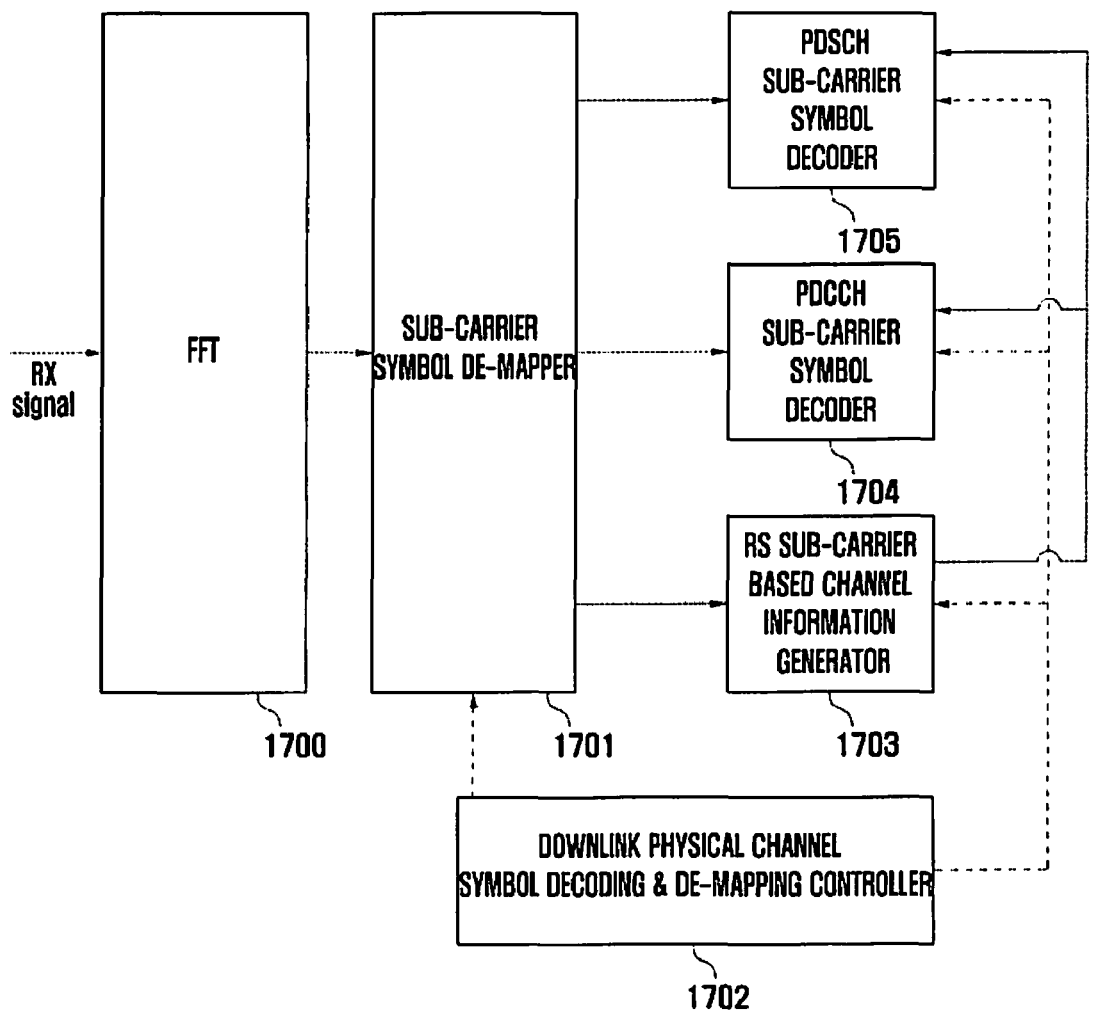
FIG. 17 is a block diagram which illustrates a reception apparatus for a downlink backhaul sub-frame of a relay node in accordance with yet another embodiment of the present invention.

FIG. 17 is a block diagram which illustrates a reception apparatus for a downlink backhaul sub-frame of a relay node in accordance with yet another exemplary embodiment of the present invention.

Referring to FIG. 17, an FFT device 1700 performs fast Fourier transform of received downlink OFDM signals and outputs respective sub-carrier reception symbols. These reception symbols are classified into PDSCH, PDCCH and RS symbols by a sub-carrier symbol de-mapper 1701.

The RS symbol is input into an RS sub-carrier based channel information generator 1703, which offers channel condition information associated with the PDSCH and PDCCH symbols to both a PDSCH sub-carrier symbol decoder 1705 and a PDCCH sub-carrier symbol decoder 1704 which perform respectively decoding of the PDSCH and PDCCH symbols inputted from the sub-carrier symbol de-mapper 1701.

A downlink physical channel symbol decoding and de-mapping controller 1702 controls the sub-carrier symbol de-mapper 1701 to perform a de-mapping of PDSCH in consideration of OFDM symbol for blank, and also controls the PDSCH sub-carrier symbol decoder 1705, the PDCCH sub-carrier symbol decoder 1704 and the channel information generator 1703.

In the case of another structure where PDCCH transmitted to the relay node in the downlink backhaul sub-frame is mapped with the PDSCH region, the downlink physical channel symbol decoding and de-mapping controller 1702 may control the sub-carrier symbol de-mapper 1701 to perform a de-w mapping of both PDCCH and PDSCH to the PDSCH region. Also, if both PDCCH and PDSCH are joint-coded to the PDSCH region, the downlink physical channel symbol decoding and de-mapping controller 1702 may control the sub-carrier symbol de-mapper 1701 to perform a de-mapping of the joint-coded symbol to PDSCH and then may control the PDSCH sub-carrier symbol decoder 1705 to perform a decoding of the joint-coded symbol.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method for transmitting an uplink backhaul sub-frame of a relay node in a relay based wireless communication system, the method comprising the steps of:
    obtaining from a base station scheduling information for the uplink backhaul sub-frame through a downlink backhaul control channel;
    performing a rate matching and mapping of data to resource regions of the uplink backhaul sub-frame by using at least one predefined symbol of the uplink backhaul sub-frame as a blank symbol, the predefined symbol being located at a front part or a rear part of the uplink backhaul sub-frame;
    performing a multiplexing of one or more symbols of the uplink backhaul sub-frame; and
    transmitting the multiplexed uplink backhaul sub-frame.

2. The method of claim 1, wherein the predefined symbol includes two contiguous symbols at the front part of the scheduled uplink backhaul sub-frame.

3. The method of claim 2, wherein performing multiplexing includes multiplexing a reference signal to fifth and eleventh symbols in the scheduled uplink backhaul sub-frame.

4. A method for receiving an uplink backhaul sub-frame of a base station in a relay based wireless communication system, the method comprising the steps of:
    performing a scheduling of the uplink backhaul sub-frame of a relay node;
    receiving the scheduled uplink backhaul sub-frame;
    performing a demultiplexing of the received uplink backhaul sub-frame;
    performing a de-mapping of symbols of the uplink backhaul sub-frame by using at least one predefined symbol as a blank symbol, the predefined symbol being located at a front part or a rear part of the scheduled uplink backhaul sub-frame; and
    performing a decoding of the de-mapped symbols to obtain uplink backhaul data.

5. The method of claim 4, wherein the predefined symbol includes two contiguous symbols at the front part of the scheduled uplink backhaul sub-frame.

6. The method of claim 5, wherein performing demultiplexing includes demultiplexing fifth and eleventh symbols in the scheduled uplink backhaul sub-frame to a reference signal.

7. A relay node in a relay based wireless communication system, the relay node comprising:
    a plurality of symbol generators configured to generate a Reference Signal (RS) symbol and Physical Uplink Shared CHannel (PUSCH) symbols;
    a Fast Fourier Transform (FFT) device configured to receive the PUSCH symbols and to perform a transform into frequency domain signals;
    a sub-carrier symbol mapper configured to receive the RS symbol and the transformed PUSCH symbols and to perform a mapping to an uplink backhaul sub-frame; and
    an uplink physical channel symbol generating and mapping controller configured to control a PUSCH symbol generator among the symbol generators to perform a rate matching of data in consideration of resource regions of the uplink backhaul sub-frame by using at least one predefined symbol as a blank symbol, the predefined symbol being located at a front part or a rear part of the scheduled uplink backhaul sub-frame, and further configured to control the sub-carrier symbol mapper to perform a mapping of the received symbols to the resource regions of the uplink backhaul sub-frame by using the at least one predefined symbol as the symbol for blank.

8. The relay node of claim 7, wherein the uplink physical channel symbol generating and mapping controller is further configured to control both the symbol generators and the sub-carrier symbol mapper to include two contiguous symbols at the front part of the scheduled uplink backhaul sub-frame as the blank symbol.

9. The relay node of claim 8, wherein the uplink physical channel symbol generating and mapping controller is further configured to control the sub-carrier symbol mapper to perform a mapping of the Reference Signal (RS) to fifth and eleventh symbols in the scheduled uplink backhaul sub-frame.

10. A base station in a relay based wireless communication system, the base station comprising:
   a sub-carrier symbol de-mapper configured to perform a de-mapping of sub-carrier reception symbols to a Reference Signal (RS) symbol and Physical Uplink Shared CHannel (PUSCH) symbols;
   an Inverse Fast Fourier Transform (IFFT) device configured to perform a transform of the de-mapped PUSCH symbols into time domain signals;
   a PUSCH symbol decoder configured to perform decoding of the transformed PUSCH symbols;
   an RS symbol based channel information generator configured to generate channel information depending on the de-mapped RS symbol; and
   an uplink physical channel symbol decoding and de-mapping controller configured to control the sub-carrier symbol de-mapper, the PUSCH symbol decoder and the RS symbol based channel information generator by using at least one predefined symbol as a blank symbol, the predefined symbol being located at a front part or a rear part of the scheduled uplink backhaul sub-frame.

11. The base station of claim 10, wherein the uplink physical channel symbol decoding and de-mapping controller is further configured to control the sub-carrier symbol de-mapper, the PUSCH symbol decoder and the RS symbol based channel information generator to include two contiguous symbols at the front part of the scheduled uplink backhaul sub-frame as the blank symbol.

12. The base station of claim 11, wherein the uplink physical channel symbol decoding and de-mapping controller is further configured to control the sub-carrier symbol de-mapper to perform a de-mapping of the Reference Signal (RS) to fifth and eleventh symbols in the scheduled uplink backhaul sub-frame.

13. A method for transmitting a downlink backhaul sub-frame of a base station in a relay based wireless communication system, the method comprising the steps of:
   performing a scheduling of the downlink backhaul sub-frame of a relay node and a scheduling of a downlink access sub-frame of user equipment in a macro cell;
   performing a mapping of control symbols of both the relay node and the user equipment to a Physical Downlink Control CHannel (PDCCH) region and a mapping of data symbols of the user equipment to a Physical Downlink Shared CHannel (PDSCH) region;
   performing a rate matching of data of the relay node in consideration of the PDSCH region excluding last M+N symbols of the downlink backhaul sub-frame and a mapping of the rate-matched data symbols to the PDSCH region excluding the last M+N symbols, where M is a number of symbols predefined for a switching time delay and N a number of symbols used for PDCCH transmission of the relay node;
   performing a multiplexing of PDCCH, PDSCH and a Reference Signal (RS) of the relay node and the user equipment to form the downlink backhaul sub-frame; and
   transmitting the downlink backhaul sub-frame.

14. A method for receiving a downlink backhaul sub-frame of a relay node in a relay based wireless communication system, the method comprising the steps of:
   performing a demultiplexing of a Physical Downlink Control CHannel (PDCCH), a Physical Downlink Shared CHannel (PDSCH) and a Reference Signal (RS) in a downlink backhaul sub-frame received from a base station;
   obtaining scheduling information of the downlink backhaul sub-frame by decoding the PDCCH;
   performing a de-mapping of data symbols in PDSCH regions excluding last M+N symbols of the downlink backhaul sub-frame, where M is a number of symbols predefined for a switching time delay and N is a number of symbols used for PDCCH transmission of the relay node; and
   obtaining downlink backhaul data by decoding the de-mapped data symbols.

15. A base station in a relay based wireless communication system, the base station comprising:
   a plurality of sub-carrier symbol generators configured to generate a Reference Signal (RS) symbol, Physical Downlink Control CHannel (PDCCH) symbols and Physical Downlink Shared CHannel (PDSCH) symbols;
   a sub-carrier symbol mapper configured to receive the RS symbol, the PDCCH symbols and the PDSCH symbols and to perform a mapping to the scheduled downlink backhaul sub-frame; and
   a downlink physical channel symbol generating and mapping controller configured to control both the sub-carrier symbol generators and the sub-carrier symbol mapper to perform a rate matching in consideration of a PDSCH region excluding last M+N symbols of the scheduled downlink backhaul sub-frame, where M is a number of symbols predefined for a switching time delay and N is a number of symbols used for PDCCH transmission of the relay node, and to perform a mapping of the rate-matched data symbols to the PDSCH region excluding the last M+N symbols.

16. A relay node in a relay based wireless communication system, the relay node comprising:
   a sub-carrier symbol de-mapper configured to perform a de-mapping of sub-carrier reception symbols to a Reference Signal (RS) symbol, Physical Downlink Control CHannel (PDCCH) symbols and Physical Downlink Shared CHannel (PDSCH) symbols;
   a PDSCH symbol decoder configured to perform a decoding of the de-mapped PDSCH symbols;
   a PDCCH symbol decoder configured to perform a decoding of the de-mapped PDCCH symbols;
   an RS symbol based channel information generator configured to generate channel information depending on the de-mapped RS symbol; and
   a downlink physical channel symbol decoding and de-mapping controller configured to control all of the sub-carrier symbol de-mapper, the PDCCH symbol decoder, the PDSCH symbol decoder and the RS symbol based channel information generator to perform a de-mapping of data symbols in PDSCH regions excluding last M+N symbols of the scheduled downlink backhaul sub-frame, where M is a number of symbols predefined for a switching time delay and N is a number of symbols used for PDCCH transmission of the relay node.

* * * * *